(12) United States Patent
Rawdon

(10) Patent No.: US 11,905,027 B1
(45) Date of Patent: Feb. 20, 2024

(54) SYSTEMS AND METHODS FOR A LIQUIFIED GAS FUEL TANK INCORPORATED INTO AN AIRCRAFT

(71) Applicant: JETZERO, INC., Long Beach, CA (US)

(72) Inventor: Blaine Knight Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/105,438

(22) Filed: Feb. 3, 2023

(51) Int. Cl.
*B64D 37/06* (2006.01)
*B64D 37/04* (2006.01)

(52) U.S. Cl.
CPC .............. *B64D 37/06* (2013.01); *B64D 37/04* (2013.01)

(58) Field of Classification Search
CPC ........ B64D 37/04; B64D 37/02; B64D 37/06; F17C 2201/0152; F17C 2270/0189; F17C 2260/038
See application file for complete search history.

(56) References Cited

U.S. PATENT DOCUMENTS

| | | | |
|---|---|---|---|
| 2,480,472 A * | 8/1949 | Jackson | F17C 3/022 62/130 |
| 2,602,614 A | 7/1952 | Cole | |
| 3,232,560 A | 2/1966 | Moise et al. | |
| 5,929,325 A * | 7/1999 | Cartwright | G01M 3/042 220/4.12 |
| 6,123,295 A * | 9/2000 | Wexler | B64G 1/14 244/119 |
| 7,806,365 B2 | 10/2010 | Miller et al. | |
| 7,871,042 B2 | 1/2011 | Velicki et al. | |
| 9,493,246 B2 | 11/2016 | Barmichev et al. | |
| 9,694,894 B2 | 7/2017 | Deakin | |
| 10,279,921 B2 | 5/2019 | Simpson | |
| 10,793,285 B2 | 10/2020 | Kooiman et al. | |
| 2004/0129836 A1 | 7/2004 | Seidel | |
| 2014/0137782 A1* | 5/2014 | Cho | B63B 3/68 114/72 |
| 2015/0336680 A1 | 11/2015 | Schumacher et al. | |
| 2020/0011483 A1* | 1/2020 | Alzaydi | F17C 1/14 |

FOREIGN PATENT DOCUMENTS

DE 3634101 A1 4/1988

OTHER PUBLICATIONS

C.W.C. Van Woensel, Integration of a Liquid Hydrogen Fuel Tank into the Concept of the Flying-V, Feb. 21, 2022.
Ilias Tapeinos, et al., Design and Analysis of a Multi-Cell Subscale Tank for Liquid Hydrogen Storage, Jul. 31, 2015.
Caleb Amy and Alex Kunycky, Hydrogen as a Renewable Energy Carrier for Commercial Aircraft, May 12, 2019.

* cited by examiner

*Primary Examiner* — Stephen J Castellano
(74) *Attorney, Agent, or Firm* — Caldwell Intellectual Property Law

(57) ABSTRACT

A system and method for a multi-compartment, liquified gas fuel tank. The liquified gas fuel tank comprises at least a tank a first compartment and a second compartment. The liquified gas fuel tank comprises a junction configured to fluidly connect the at least two compartments of the at least a tank to enable more efficient storage of liquified gas fuel.

18 Claims, 19 Drawing Sheets

SYSTEMS AND METHODS FOR A LIQUIFIED GAS FUEL TANK INCORPORATED INTO AN AIRCRAFT

FIELD OF THE INVENTION

The present invention generally relates to the field of air travel. In particular, the present invention is directed to a system and method for a liquified gas tank incorporated into an aircraft.

Liquified gas fuel has characteristics favorable as an aviation fuel.

SUMMARY OF THE DISCLOSURE

In an aspect, a liquified gas fuel tank for an aircraft includes a first compartment wherein the first compartment has a first cross-section describing a first continuously convex differentiable curve, the first compartment includes an inner volume configured to contain fuel, and the first compartment is configured to be pressurized, a second compartment wherein the second compartment has a second cross-section describing a second continuously convex differentiable curve which intersects the first continuously convex differentiable curve at an intersection, and the second compartment includes an additional inner volume fluidly connected to the inner volume of the first compartment, and a junction configured to structurally support each of the first compartment and the second compartment at the intersection.

In another aspect, a method of manufacturing a liquified gas fuel tank for an aircraft includes constructing a first compartment wherein the first compartment has a first cross-section describing a first continuously convex differentiable curve, the first compartment includes an inner volume configured to contain fuel, and the first compartment is configured to be pressurized, constructing a second compartment wherein the second compartment has a second cross-section describing a second continuously convex differentiable curve which intersects the first continuously convex differentiable curve at an intersection, and the second compartment includes an additional inner volume fluidly connected to the inner volume of the first compartment, and connecting the first compartment and the second compartment with a junction configured to structurally support each of the first compartment and the second compartment at the intersection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3I is a front quarter view of an exemplary embodiment of a multi-compartment tank trimmed with septa;

Figure 1:
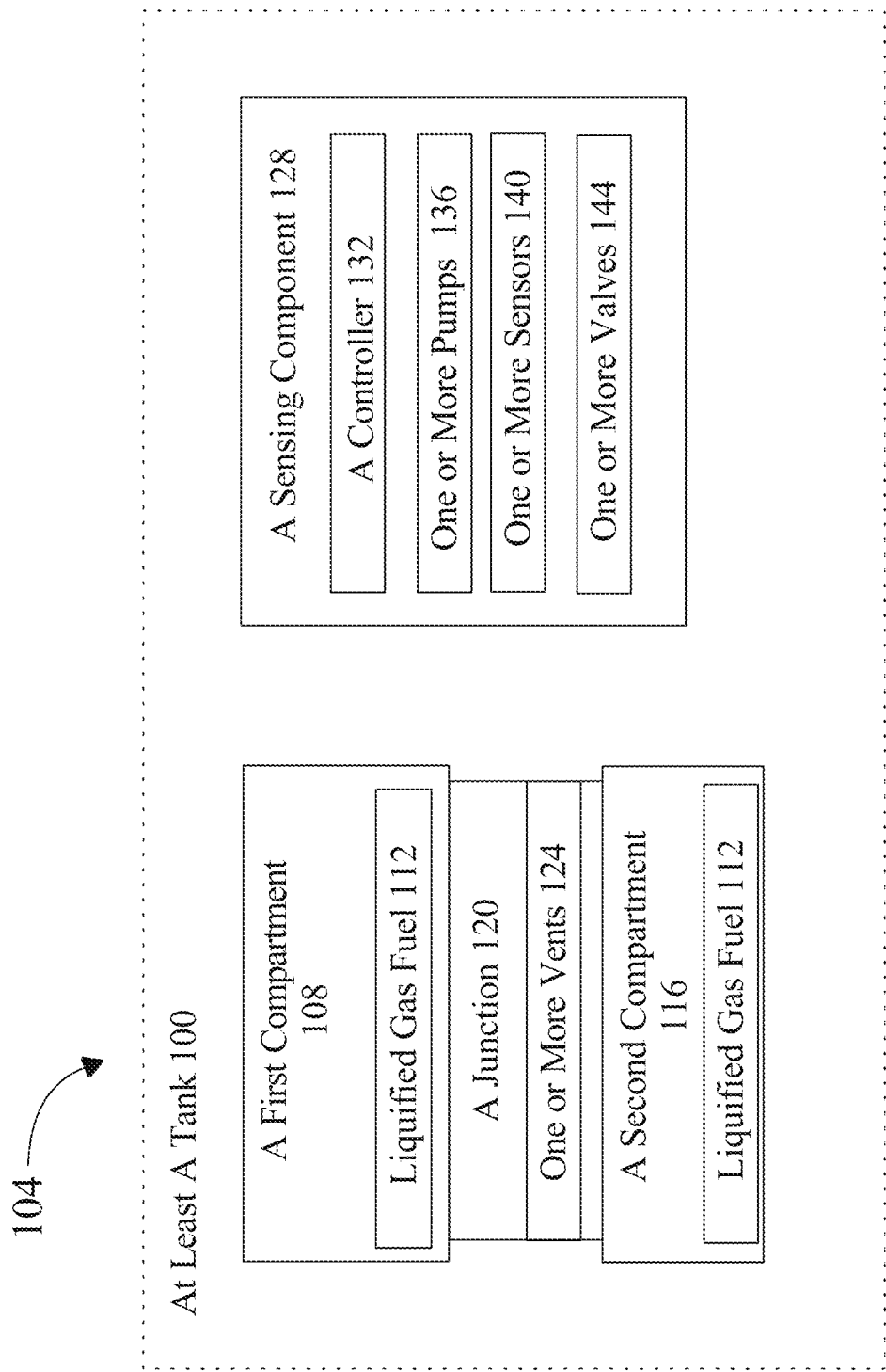
FIG. 1 is a block diagram for the exemplary embodiment of a liquified gas fuel tank incorporated in an aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure include a liquified gas fuel tank. Aspects of the present disclosure include a first compartment. Aspects of the present disclosure include a first compartment having a first cross section describing a continuously convex differentiable curve. Aspects of the present disclosure include a first compartment having a first inner wall defining a first internal cavity of the first compartment and a first outer wall exterior to the first inner wall, and a first separation of the first inner wall and the first outer wall defines a first space. Aspects of the present disclosure include a first compartment having an inner volume containing liquified gas fuel and is pressurized. Aspects of the present disclosure further include a second compartment has a second cross-section describing a continuously convex differentiable curve. Aspects of the present disclosure includes a second compartment having a second inner wall defining a second internal cavity of the second compartment and a second outer wall exterior to the second inner wall, and a second separation of the second inner wall and the second outer wall defines a second space. Aspects of the present disclosure further include the first compartment and the second compartment are at least partially separated from one another. Aspects of the present disclosure include a second compartment having an inner volume containing liquified gas fuel and is pressurized.

Aspects of the present disclosure include second compartment includes an additional inner volume containing liquified gas fuel. Moreover, aspects of the present disclosure include a junction, wherein the junction fluidly connects the first internal cavity and the second internal cavity a junction fluidly connecting a first internal cavity and a second internal cavity.

Aspects of the present disclosure include method of manufacturing a liquified gas fuel tank. Aspects of the present disclosure include constructing a first compartment and a second compartment of the liquified gas fuel tank. Aspects of the present disclosure include forming a first space between a first inner wall and a first outer wall by constructing the first inner wall having a first continuously convex differentiable curve cross section and constructing the first outer wall with the first continuously convex differentiable curve cross section. Aspects of the present disclosure include forming a second space between a second inner wall and a second outer wall by constructing the second inner wall having a second continuously convex differentiable curve cross section and constructing the second outer wall with the second continuously convex differentiable curve cross section. Aspects of the present disclosure include constructing the liquified gas fuel tank comprises connecting the first compartment and the second compartment via a junction, and the junction connects the first space to the second space.

Now referring to FIG. 1, a block diagram of an exemplary embodiment of at least a tank for liquified gas fuel is shown. At least a tank 100 may be incorporated and/or installed in an aircraft 104 as described in further detail below. In this disclosure, a "tank" is a container of fluids; fluids may include liquid or gas fuel. In an embodiment, at least a tank 100 may store fuel to power aircraft 104. At least a tank 100 may be permanently attached to aircraft 104. As used in this disclosure, a tank may be "permanently attached" when it is configured to not be removed during ordinary use. For example, a tank permanently attached to aircraft may be removed during maintenance or overhaul but is otherwise a permanent flight component of the aircraft. At least a tank 100 may include one or more compartments to store fuel in. In some embodiments, all compartments of at least a tank 100 may have fluidic communication between one another. Accordingly, in these embodiments, all compartments may have substantially similar pressures. At least a tank 100 may be a part of fuel delivery system for an engine, in which the fuel may be stored inside the at least a tank and then propelled or released into an engine, such as without limitation a combustion engine. At least a tank 100 may be a pressure vessel. As used in this disclosure, "pressure vessel" is a container configured to hold fluids at a pressure that may differ from an ambient pressure. Pressure vessel may be configured to be pressurized in order to allow flow of gaseous fuel from at least a tank 100, for example without a need to pump. In an embodiment, but without limitation, at least a tank 100 may act as a pressure vessel to store the fuel at a high pressure, such as without limitation above 5 psig, 15 psig, 50 psig, or the like. At least a tank 100 may be made of any material able to withstand such high pressure, such as without limitation metals (e.g., aluminum, stainless steel, titanium, and/or one or more alloys), carbon fiber and/or carbon fiber composites, composite materials such as without limitation fiberglass, polymer materials such as without limitation high density polyethylene, plastic polypropylene, or the like. At least a tank 100 may further include an inner wall and an outer wall. At least a tank 100 may also include safety valves, closures, vessel threads, or any other features that can be found on fuel tanks. At least a tank 100 may further have a tank geometry. "Tank geometry" refers to an overall shape and/or arrangement of at least a tank 100. A least a tank 100 may include one or more curvatures, for example the at least a tank 100 may have one or more surfaces with continuously differentiable surfaces. According to some embodiments, tank geometry for a blended wing body aircraft 104 may be driven by at least five objectives: (1) to provide as much fuel volume as possible while using little payload floor space and/or cabin volume, (2) to provide a fuel tank shape that resists pressure and that is lightweight, (3) to provide a fuel tank shape that can be insulated between outer wall and inner wall, (4) to provide a fuel center of gravity that is not widely misaligned with the aircraft's center of gravity, and (5) to provide fuel tanks that are compatible with a passenger cabin. In this disclosure, a "fuel center of gravity" is the center of gravity of the fuel inside at least a tank 100. In some cases, fuel center of gravity may affect overall aircraft center of gravity. Fuel center of gravity may be associated with a volume within airplane that has sufficient volume to store a practical quantity of fuel in discrete tanks. At least a tank 100 may be arranged inside blended wing body 104 as a function of its fuel center of gravity in relation to center of gravity of aircraft 104. Tank geometry is further discussed herein with reference to FIGS. 2 and 3A-N.

With continued reference to FIG. 1, at least a tank 100, further includes a first compartment 108, a second compartment 116, liquified gas fuel 112, and a junction 120. At least a tank 100 may be a permanent tank. A permanent tank may be added to an existing airplane or attached during the airplane's construction. In either case, the intention of a permanent tank may be to leave at least a tank 100 in place for an extended period. A permanent tank may integrate at least a tank 100 and aircraft 104 structure so that the aircraft 104 supports at least a tank 100, and/or at least a tank 100 supports aircraft 104. In some embodiments, curved surfaces of at least a tank 100 may not be well suited to assisting structural surfaces of aircraft 104 and/or maximizing efficient use of volume within an outer mold line (OML) of the aircraft.

Still referring to FIG. 1, at least a tank 100 is filled with and/or configured to be filled with a fuel; fuel is liquified gas fuel 112. Liquified gas fuel may include liquid hydrogen, propane, natural gas, or the like. Liquified gas may be used for airliner-scale systems. Liquified gas fuel 112 may have a higher density than gaseous fuel; even so, liquified gas fuel 112 may require about four times the volume of Jet-A fuel. Additionally, liquified gas fuel 112 may also allow for reduced tank pressure and tank weight as compared to gas fuel. Liquified gas fuel 112 may be kept at extremely low, cold temperatures, for example below its critical point of 33 Kelvin. Gas turbine engines, such as combustion engines, may operate on gaseous fuel and may transition liquified gas fuel 112 into a gas before consumption; gaseous fuel may be supplied to the engine at high pressure; in some embodiments no fuel pump may be used to provide fuel to the engine. In some embodiments, gas may squirt into a combustion chamber due to compressor stages. Vapor from tank ullage may be combined with the vapor from an output of a fuel heater. In some cases, this combined channel may then lead to an engine for combustion. When boiled, a rate of boil-off for liquified gas fuel 112 may be determined as a function of heat energy applied to liquified gas fuel 112. Boil-off rate for liquified gas fuel 112 may be selected based upon anticipated fuel consumption. At least a tank 100 may be insulated with an insulation to control application of heat to tank contents, and thereby achieve a selected boil-off rate. At least a tank 100 may also be refrigerated to remove heat from liquified gas fuel 112. The degree of insulation may be selected to provide a desired rate of boil-off. A selected rate of boil-off for liquified gas fuel 112 may generally be less than a rate at which liquified gas fuel 112 is consumed by the engines and possibly other aircraft systems, such as without limitation an Auxiliary Power Unit (APU). Excess boil-off may be dumped overboard or outside of aircraft through a vent.

Continuing to refer to FIG. 1, at least a tank may include a first compartment 108. In this disclosure, a "compartment" is a separate section of a structure that can contain a substance. First compartment 108 may be used to store liquified gas fuel 112. First compartment 108 may be constructed such that the first compartment 108 has a first cross-section describing a continuously convex differentiable curve. As used in this disclosure, a "continuously convex differentiable curve" is a continuous convex curve which is differentiable at substantially all points along the curve; where this phrase is used in this application to refer to a physical component (e.g., tank 100), intention is to convey an overall or approximate shape of the physical component, for instance with ordinary manufacturing tolerances or practical limits. Exemplary non-limiting continuously convex differentiable curves include sections of circles, ellipses, conic curves, parabolas, and the like. In some cases, a continuously convex differentiable curve may be a circular or elliptical section having an eccentricity inclusive of 0.5 and 1.0 and an ellipticity inclusive of 0.5 and 1.0. First compartment 108 may be constructed as such to reduce a number of vertices on any surface defining the first compartment 108. That is, a surface of first compartment 108 may have a smooth surface with no corners. Additionally, first compartment 108 may include a first inner wall that defines a first internal cavity of first compartment 108. First inner wall may be made of any suitable material as described herein. For example, first inner wall may be a material with certain heating properties that allow heat to be transferred and/or insulated from a heat source to liquified gas fuel 112 stored in an inner volume in first internal cavity. Further, the first compartment may include a first outer wall exterior to first inner wall. First outer wall may be made of the same material as first inner wall or a different material. First inner wall and first outer wall may be separated by a first distance. Thus, a first space is defined therein. In other words, "first space" is a volume of a wall of first compartment 108 and may be a hollow space such that the first space may capture any fluid leaks from an internal cavity of first compartment 108.

Still referring to FIG. 1, at least a tank 100 may include a second compartment 116. Second compartment 116 may include similar features discussed herein regarding first compartment 108. That is, second compartment 116 may be constructed in a similar or same manner and with the same considerations as first compartment 108 as discussed above. It should be noted that discussion herein regarding first compartment 108 and second compartment 116 may also be applied to an nth compartment. For example, at least a tank 100 may include first compartment 108, second compartment 116, a third compartment, and so forth. In some instances, the number of compartments may depend on the shape and structure of aircraft 104. For example, to optimize volume of aircraft 104 filled with at least a tank 100, multiple compartments with cross-sections describing a continuously convex differentiable curve may be utilized rather than a 3-D shape to conform to a desired volume.

Still referring to FIG. 1, at least a tank 100 may include a junction 120. A "junction," as used in this disclosure, is an intersection where two or more objects are joined together. Junction 120 may be configured to structurally support at least a tank 100. In some cases, junction 120 may intersect with a first wall of first compartment 108 and a second wall of second compartment 116; and each of the first wall, the second wall, and the junction may be configured to be substantially loaded in tension when one or both of the first compartment 108 and the second compartment 116 are pressurized. In some instances, a junction 120 may be disposed at a section of at least a tank 100 where first compartment 108 and second compartment 116 abut each other. That is, junction 120 may serve as a physical boundary between first compartment 108 and second compartment 116. Junction 120 may include a structural member that runs from a first intersection between walls of a first and second compartment to a second intersection between walls of a first and second compartment. In some instances, junction 120 may include one or more apertures and/or vents. One or more apertures may enable fluid communication between first compartment 108 and second compartment 116. To ensure that no additional stress is added to walls of at least a tank 100, each compartment of the at least a tank 100 may have an equalized pressure. That is, each compartment of at least a tank 100 may have similar or substantially equal pressure, thereby preventing walls of the at least a tank 100 from deforming or experiencing uneven loading. In some embodiments, a junction may be referred to as a septum. In some cases, a septum may be configured to carry structural loads. For example, loads intrinsic to the tank as well as loads extrinsic to the tank (e.g., loads resulting from pressurization of aircraft). As used in this disclosure, a "septum" is a structural element within a tank between chambers (e.g., a first compartment 108 and a second compartment 116). Further disclosure related to junctions 120 (i.e., septa) may be found with reference to FIGS. 3C-D, 3G-I, and 3K. In some cases, a septum may be perforated or otherwise allow for fluidic communication between two or more compartments on opposing sides of the septum. Relationship between at least a tank 100 and aircraft 104 is further described herein with reference to FIG. 3L.

In some embodiments, junction 120 joins a first internal cavity and a second internal cavity of first compartment 108 and second compartment 116, respectively. "A cavity" is a section of at least a tank 100 that is vacant or that stores substances and/or that is filled with ambient air or gas. Junction 120 may enable fluid communication between first internal cavity and second internal cavity.

Still referring to FIG. 1, comprises one or more vents 124. As used in this disclosure, a "vent" is an opening and/or aperture configured to allow one or more fluids to pass. In an embodiment, one or more vents 124 may be configured to vent gaseous fuel from at least a tank 100. Gaseous fuel may result from boil-off of liquified gas fuel 112 as the fuel warms. In an embodiment, and without limitation, one or more vents 124 may be configured to vent boil-off from at least a tank 100. In some cases, one or more vents 124 may include a check valve. As used in this disclosure, a "check valve" is a valve that permits flow of a fluid only in certain (e.g., one) directions. In some cases, check valve may be configured to allow flow of fluids substantially only away from at least a tank 100 while preventing back flow of vented fluid to at least a tank 100. One or more vents 124 may also include a pressure regulator. A "pressure regulator" is a type of valve that controls the pressure of a fluid. Venting gaseous fuel from at least a tank 100 prevents over-pressurizing or other events that may cause catastrophic damage or harm. It may also desirable, when aircraft 104 is grounded, to connect a system of lines and tanks to one or more vents 124 to collect the boiled-off fuel. In some cases, the collected gaseous fuel can be compressed by a pump into storage tanks and then cooled to liquid temperatures for reuse as aircraft fuel. In some instances, junction 120 may include one or more actuatable vents 124 that may be opened or closed to facilitate fluid communication between first internal cavity and second internal cavity. For example, there may be a pressure difference between first internal cavity and second internal cavity. To equalize pressure in both cavities, one or more actuatable vents 124 formed injunction 120 may be switched to an open position to facilitate fluid transfer from one cavity to another. Alternatively, first compartment and second compartment may be maintained in fluidic communication, thereby allowing for substantially equal pressure at substantially all times. In some cases, a pressure gradient may exist such that no additional outside intervention may be needed to transfer fluid from first compartment 108 to second compartment 116 or vice-versa.

Still referring to FIG. 1, at least a tank 100 may include an insulation. In this disclosure, "insulation" is a component or layer configured to reduce heat transfer. Insulation may be used to reduce thermal transfer to liquified gas fuel inside of at least a tank 104. Heat may be transferred to at least a tank 100 by at least three means: convection, conduction, and radiation. To reduce conduction, insulation may include a vacuum to separate an interior volume of at least a tank 100 from an exterior with an evacuated vessel. Another means to reduce conduction and/or convection in at least a tank 100 may be an insulating material that inhibits conduction and/or convection. Insulating materials include fiberglass wool, plastic or ceramic foam, aerogel, and other materials. Heat flow through an insulator may be inversely proportional to its thickness. For example, an insulator that is twice as thick may conduct heat at half the rate. Heat transfer by radiation may be reduced by reflective, scattering, and/or absorbing coatings. Reflective coatings may be located proximal surfaces of at least a tank 100 and/or on intermediate materials within insulation. For example, a dewar may be coated with a mirror-like material that reflects heat radiation; many thermos bottles are silvered for this reason. A "dewar" is double-walled flask of metal or silvered glass with a vacuum between the walls and configured to hold a liquid. Another means to reduce radiation may be to sandwich multiple layers of thin reflective foil within an insulative material such as foam. Additionally, a modest amount of insulation may be needed to limit boil-off to a rate below that needed to provide fuel vapor to the engines in cruise. On the ground, a system to capture boil-off liquified gas fuel 112 may be provided. Another characteristic requirement for insulation includes a ration of volume to surface area of at least at tank 100. A very large tank may provide a large volume of liquified gas fuel 112 per unit surface area. Boil-off rate may be determined by heat transferred into at least a tank 100. Heat transferred into the at least a tank 100 may be a function of tank surface area and/or insulation effectiveness. For example, heat transferred into at least a tank 100 may be proportional to tank surface area and/or inversely proportional to insulation effectiveness. For a given insulation and storage volume, at least a tank 100 having a larger surface area may result in more boil-off. Or, for a given boil-off rate and storage volume, at least a tank 100 having a larger surface area will need more insulation. In some cases, increased tank 100 storage volume increases a thermal mass of liquified gas fuel, which in turn requires more heat to warm (and boil-off). As explained above, degree of insulation may be selected to provide a desired rate of boil-off. insulation may also include a chamber located between the inner wall and the outer wall foams, aerogels, reflective materials, and the like of at least a tank 100. Chamber may contain gas such as air, nitrogen, argon or the like. In some cases, gas may be actively pumped into the chamber to ensure that the gas within the chamber is clean and dry and thereby not conducive to condensation, freezing or contamination.

In some embodiments, and continuing to refer to FIG. 1, a tank 100 may have a 3-D shape to conform to a desired volume, which may allow the tank 100 to fit within an entire volume of aircraft 104. In some cases, tank 100 may include compartments with cross-sections describing a continuously convex differentiable curve such that a surface of the compartments is a smooth surface. By having a smooth surface (i.e., a continuously differentiable surface), stress on a wall of a compartment may be reduced. In addition, reducing stress on a wall of a compartment may allow for easier construction of at least a tank 100. For instance, at least a tank 100 may be constructed to have thin walls. Indeed, at least a tank 100 being constructed with a thin wall may allow for thin wall approximations when calculating hoop stress as discussed herein.

Still referring to FIG. 1, in some embodiments, constructing the at least tank 100 with thinner walls of may lessen the cost of construction by using thin and/or less materials. Also, a total weight of at least a tank 100 may be lessened by using less materials and/or lighter materials. Additionally, or alternatively, a total weight of at least a tank 100 may be lessened relative to an original design because of a thin wall. That is, effects of constructing at least a tank 100 with a heavier material may be mitigated by constructing a thin wall because the construction would inherently use less material and thus have a lower total weight.

Further referring to FIG. 1, at least a tank 100 may include a sensing component 128. Sensing component 128 may include a controller 132, one or more blowers or pumps 136, one or more sensors 140, one or more valves 144, or any combination thereof. Controller 132 may be communicatively coupled to at least tank 100. In addition, controller 132 may be communicatively coupled to other components of sensing component 128 in order to control fluid communication of at least a tank 100. For example, the sensing component 128 may receive a first indication, which may indicate that a first gas concentration exceeds a threshold gas concentration, from one or more sensors 140. In response to receiving the first indication, sensing component 32 may send a signal to one or more valves 144, via controller 132, to switch from a closed position to an open position. Moreover, in response to one or more valves 144 switching from a closed to open position, controller 132 may send an activation signal to one or more pumps 136 to activate the one or more pumps 136 to direct boiled-off gas from a first space and a second space through one or more valves 144. For instance, in some cases, an inner wall of tank 100 may slowly leak gaseous fuel, into a space between the inner wall and outer wall. In some cases, controller 132 may be configured to detect, using sensors 140, gas levels within this space an evacuated the gas as needed using one or more of pumps 136 and valves 144.

With continued reference to FIG. 1, controller 132 may include any controller as described in this disclosure, including without limitation a microcontroller, microprocessor, digital signal processor (DSP) and/or system on a chip (SoC)

as described in this disclosure. Controller 132 may include, be included in, and/or communicate with a mobile device such as a mobile telephone or smartphone. Controller 132 may include a single controller operating independently, or may include two or more controllers operating in concert, in parallel, sequentially or the like, two or more controllers 132 may be included together in a single controller 132 or in two or more controllers 132. Controller 132 may interface or communicate with one or more additional devices as described below in further detail via a network interface device. Network interface device may be utilized for connecting controller 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two controllers, and any combinations thereof. A network may employ a wired and/or a wireless mode of communication. In general, any network topology may be used. Information (e.g., data, software etc.) may be communicated to and/or from a computer and/or a controller 132. Controller 132 may include but is not limited to, for example, a controller 132 or cluster of controllers 132 in a first location and a second controller 132 or cluster of controllers 132 in a second location. Controller 132 may include one or more controllers 132 dedicated to data storage, security, distribution of traffic for load balancing, and the like. Controller 132 may distribute one or more computing tasks as described below across a plurality of controllers 132 of controller 132, which may operate in parallel, in series, redundantly, or in any other manner used for distribution of tasks or memory between controllers 132. Controller 132 may be implemented using a "shared nothing" architecture in which data is cached at the worker, in an embodiment, this may enable scalability of system 128 and/or controller 132.

With continued reference to FIG. 1, controller 132 may be designed and/or configured to perform any method, method step, or sequence of method steps in any embodiment described in this disclosure, in any order and with any degree of repetition. For instance, controller 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Generally, sensing component 128 may send signals to various components within aircraft 104. In some instances, sensing component 128 may require communication with one or more sensors 140 to determine what actions to signals to send out. It should be noted that one or more sensors 140 may be gas sensors, pressure sensors, velocity sensors, or any combination thereof. One or more sensors 140 may be disposed within various parts of aircraft 104 to provide more an accurate state of operation metric.

Still referring to FIG. 1, at least a tank 100 may include conduits that may fluidly couple one or more valves 144 to a first space and a second space and/or a first compartment 108 and a second compartment 116, as described herein. Conduits may connect one or more valves 144 to an internal space to facilitate a transport of boil-off gas to a fuel cell. In addition, conduits may facilitate a transport of any gas fuel that may leak into a first space into a first internal space, a secluded reservoir, air exterior to at least a tank 100 and/or a vehicle containing at least a tank 100, or both.

Figure 2:
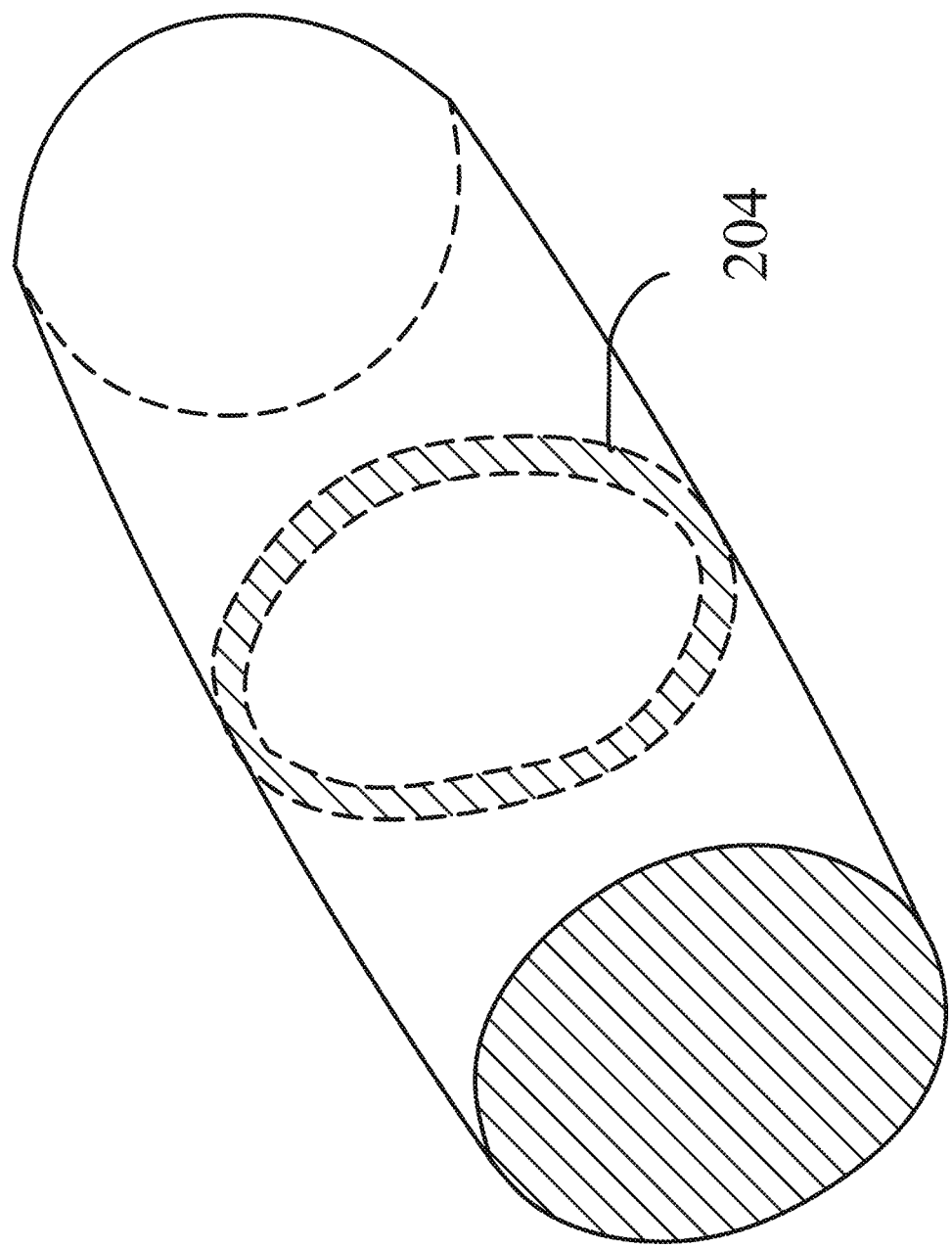
FIG. 2 is an exemplary embodiment of at least a tank with mathematical equations to calculate the force and stress of the at least a tank.

Now referring to FIG. 2, shown is an exemplary embodiment of at least a tank 100. In FIG. 2, force and stress exerted on at least a tank 100, for instance by pressurized fuel contained therein, may be considered in a cylindrical portion 204 and an end of the cylindrical portion. Stress within cylindrical portion may be calculated according to:

$$\text{Stress} = \frac{\pi r^2 P}{2\pi r t} = \frac{Pr}{2t}$$

where, r is radius of the cylinder, P is pressure, and t is thickness of tank wall. Force at end of the cylinder may be found according to.

$$\text{Force} = \pi r^2 P$$

A component that may heavily impact shape of at least a tank 100 is pressure. At least a tank 100 may be far lighter if pressure is resisted in tension as compared to bending, compression, and/or shear. In some embodiments, tension in a tank may be generally achieved by shapes that provide a generally round cross section, including spheres, cylinders, and cones. In an embodiment, a pressurized tank of a given volume may be made as a sphere to place the tank in pure tension. As discussed herein, "negligible" is a value significantly smaller than the average magnitude of any other value of the same unit of measurement measured and/or discussed. In some cases, constructing a least a tank 100 with thin walls (i.e., a thickness less than 1/10 of the radius) allows for a thin wall approximation to be made. Alternatively, a tank made as a cube may require tank walls to operate while subjected to and/or resisting bending, shear, and/or compression; thus, the cube tank would be vastly heavier than a sphere tank of similar volume. Accordingly, in some embodiments, any tank geometry may provide tank walls acting in tension. Tank geometry is further described in FIGS. 3A-N.

Still referring to FIG. 2, the walls of at least a tank 100 may operate at or below a limit stress. As used in this disclosure, "limit stress" is a threshold stress below which at least a tank 100 may operate at to avoid failure or damage. Stress may be defined in hoop direction or longitudinal direction. As shown in FIG. 2, stress of a thin-wall cylindrical tank may be calculated in the hoop direction by multiplying the pressure (e.g., in lb./in$^2$) by the radius (e.g., in inches), and then dividing that value by the tank wall thickness (e.g., in inches). Also as shown in FIG. 2, stress of a thin-wall cylindrical tank may be calculated in the longitudinal direction by dividing the hoop stress in half. A mathematical equation shown for stress may be found by first calculating a force by multiplying pi by the radius squared and the pressure; the force may then be divided by $2*\pi*r*t$ to calculate the stress. Thus, the equation simplifies to half the hoop stress, or $P*r/2*t$. A maximum stress in a cylindrical tank may be a vector sum of hoop and longitudinal stresses. A thin-wall hemisphere may provide equal stress everywhere of $P*r/2*t$. A cylindrical tank may be fabricated with end caps. As used in this disclosure, an "end cap" is an end of a tank and/or a compartment of a tank. End caps, like tanks themselves, may have curvature. Generally, end caps may have a continuously convex differentiable curvature, for example spherical. In some cases, end caps may be nearly spherical, elliptical, cylindrical, or the like. In some cases, an end cap may be spherical and have a radius similar to that of the cylinder which it is capping. In this case, the end cap may be considered ideally selected for resisting stresses, for example with a hemispherical end cap. However more volume within the aircraft cabin is likely wasted from the bulging end cap. Instead in some cases, end cap may be selected to compromise resistance to stress in exchange for improved cabin volume utilization. For example, where end caps are spherical and have twice the radius of the cylinder they are capping, stresses in all parts of the tank may be similar or below that of those stresses within the cylindrical portion of the tank (assuming tank skin thickness is constant) and the cylindrical portion may be lengthened to increase tank volume.

Figure 3A:
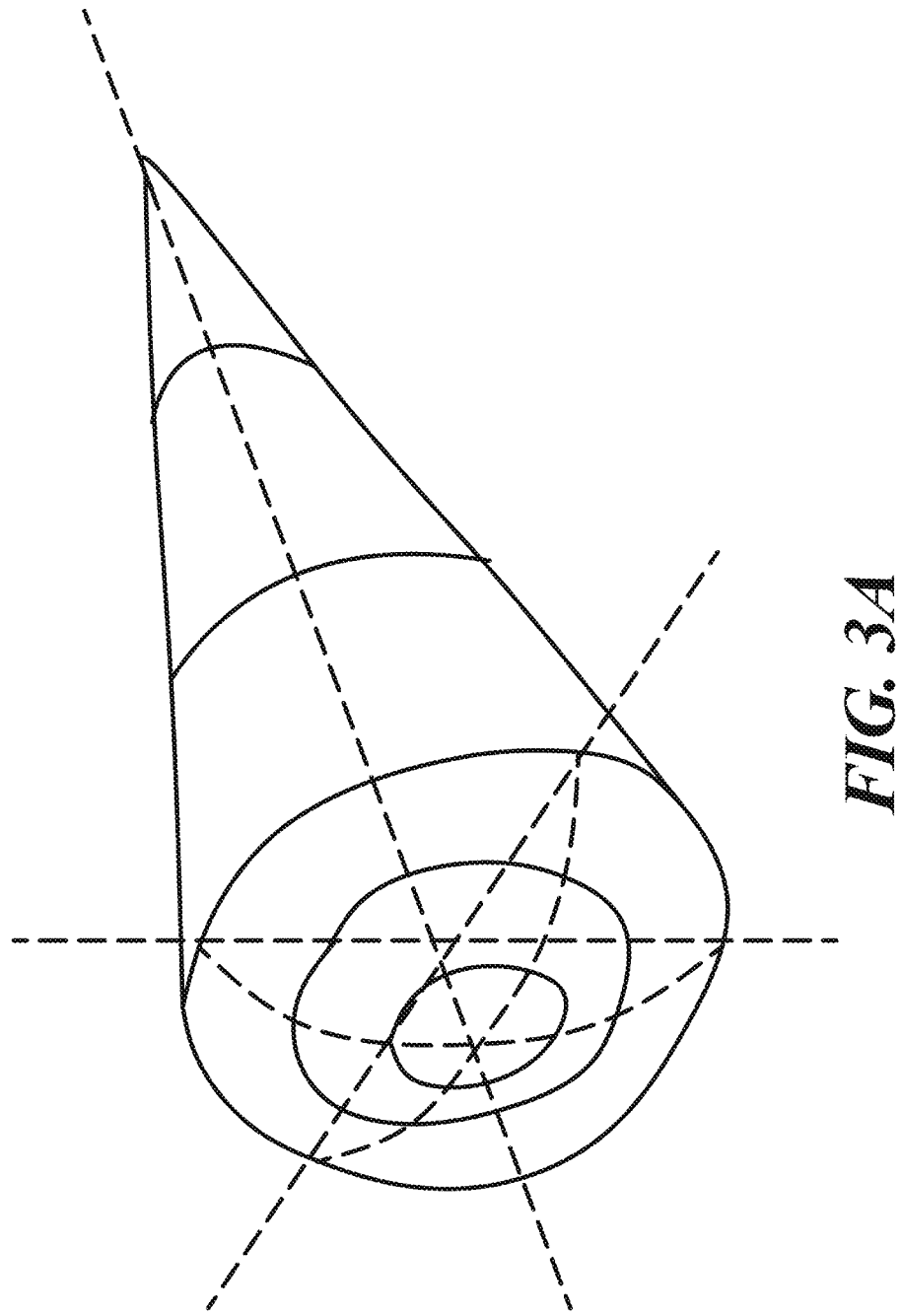
FIG. 3A is an isometric view of an exemplary embodiment of a conical tank.
Figure 3B:
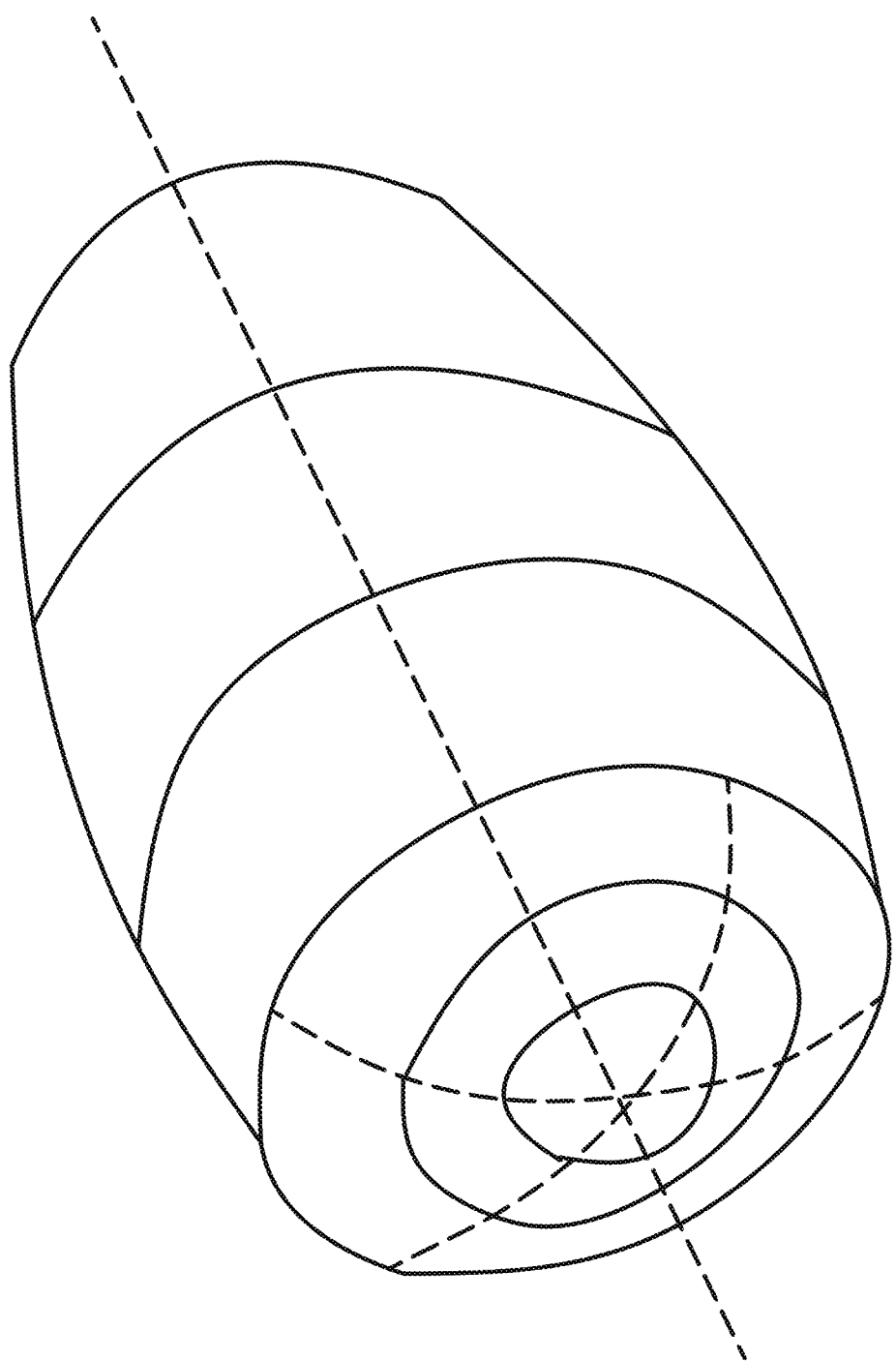
FIG. 3B is an isometric view of an exemplary embodiment of a curved axisymmetric tank.
Figure 3C:
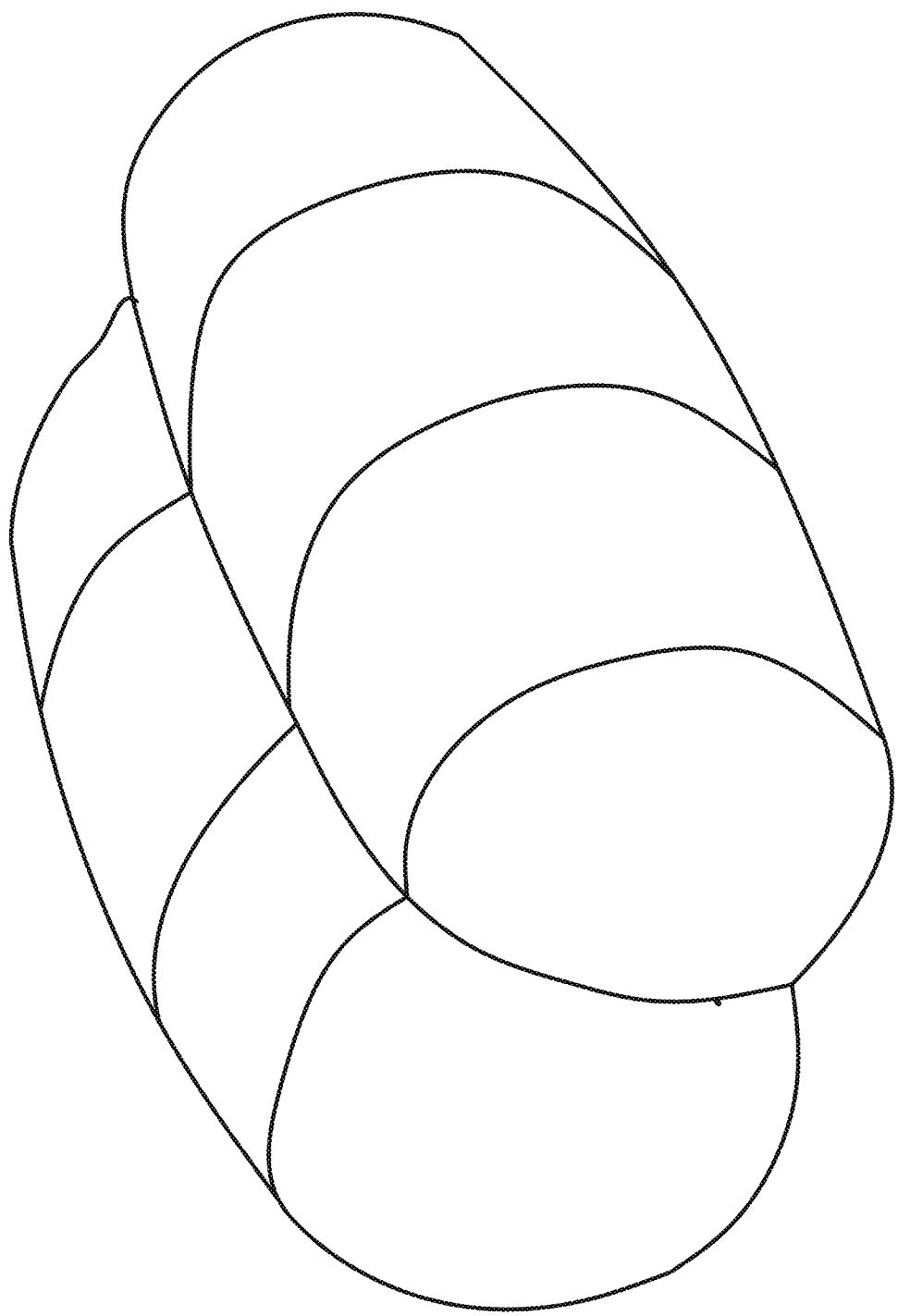
FIG. 3C is an isometric view of an exemplary embodiment of a double-curved tank.
Figure 3D:
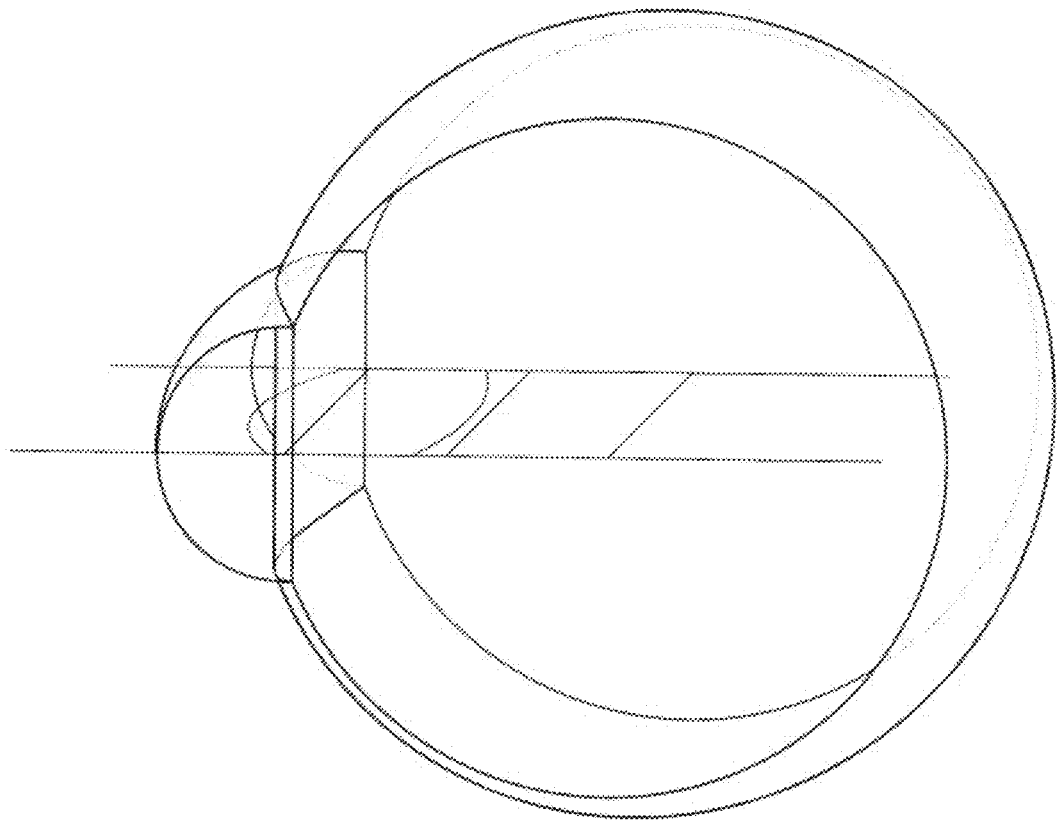
FIG. 3D is a front quarter view of an exemplary embodiment of a dual tank with different diameters.
Figure 3E:
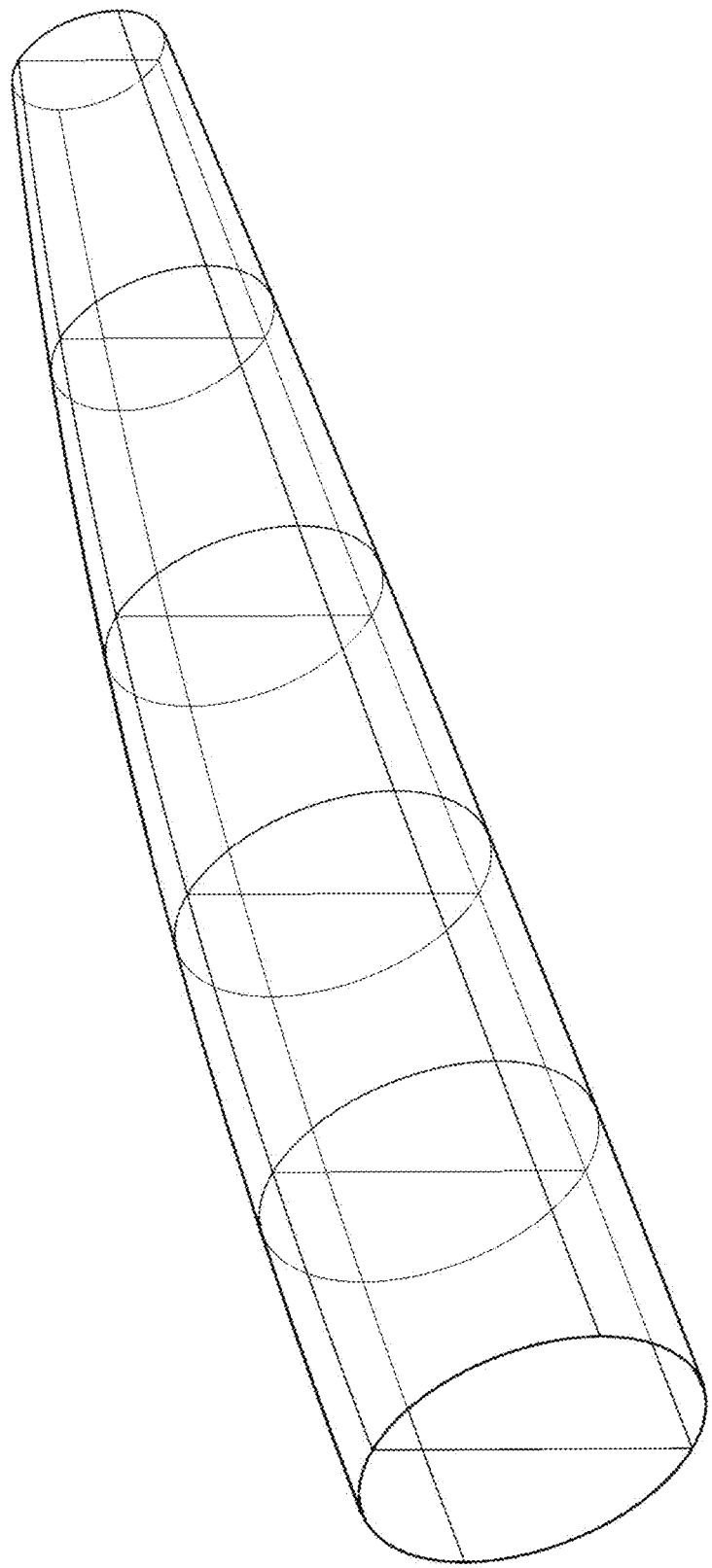
FIG. 3E is a quarter side view of an exemplary embodiment of a cambered, tapered tank.
Figure 3F:
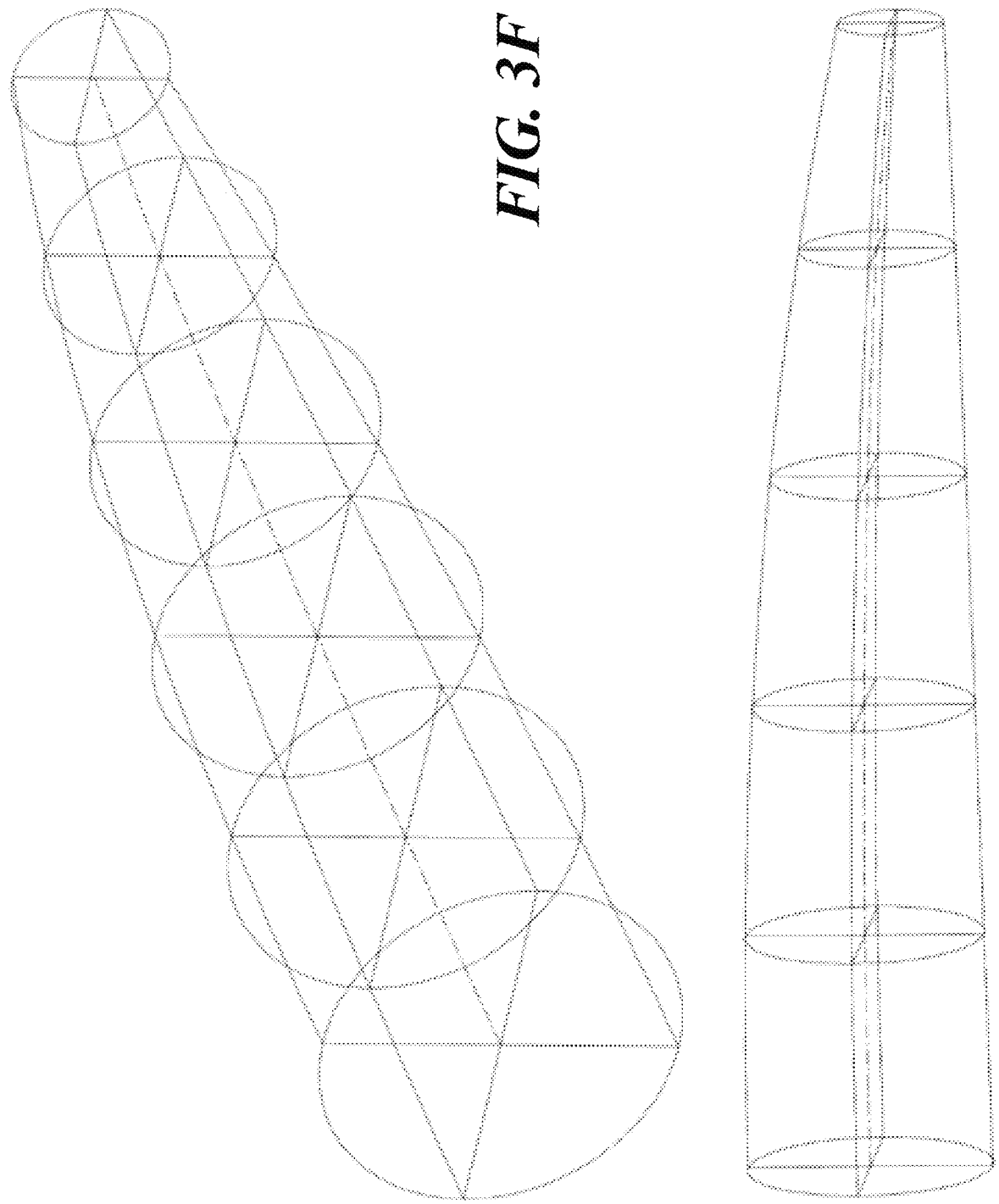
FIG. 3F illustrates an isometric and side quarter views of an exemplary embodiment of a dual cambered tank.
Figure 3G:
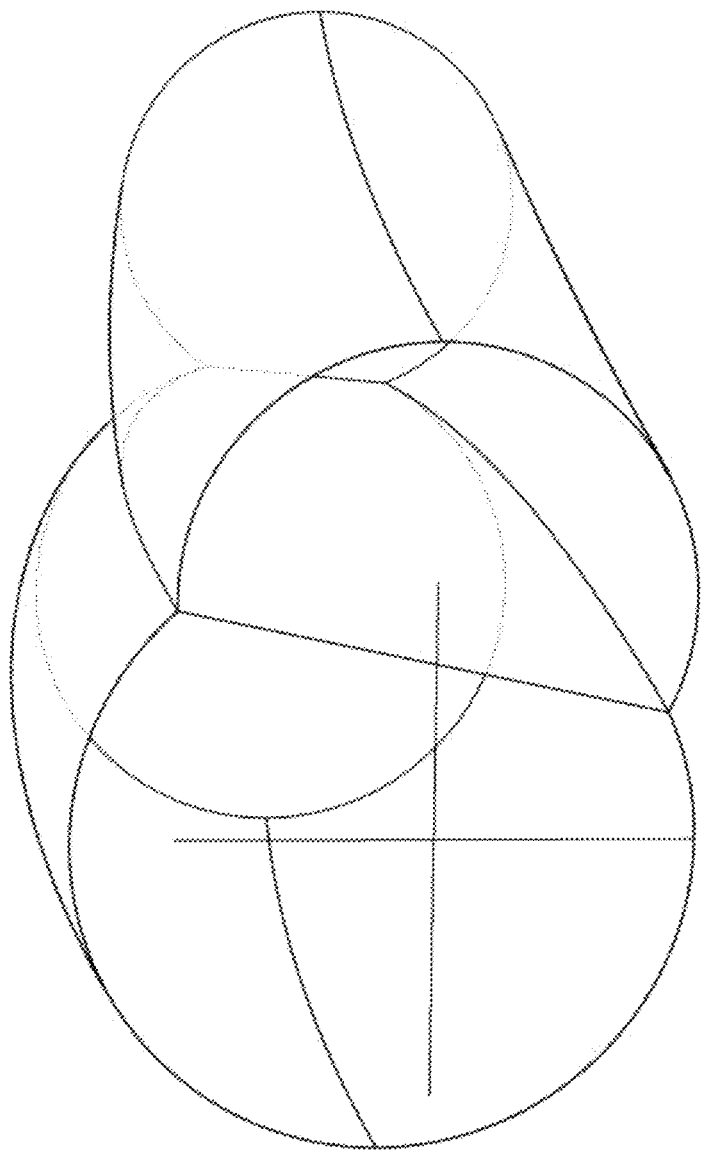
FIG. 3G shows a quarter front view of an exemplary embodiment of a double tank.
Figure 3H:
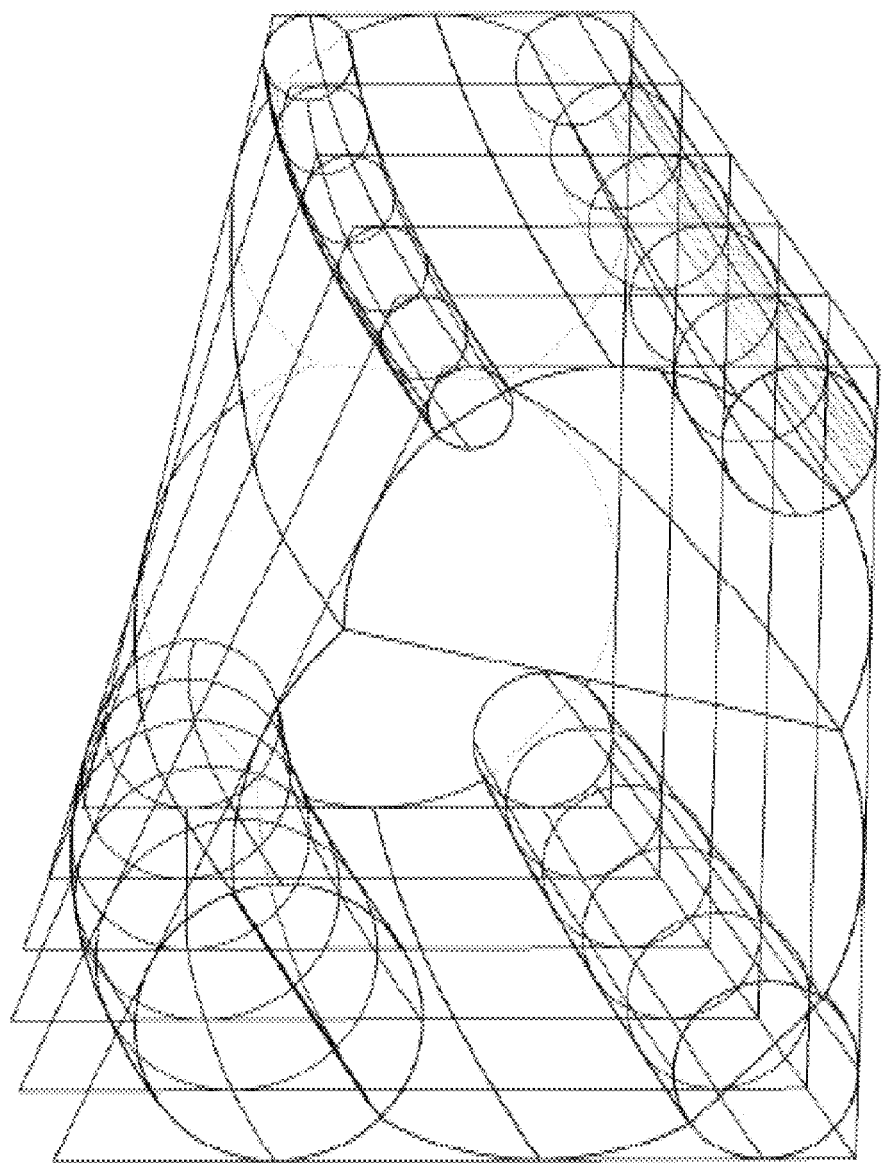
FIG. 3H shows a front quarter view of an exemplary embodiment of a multi-compartment tank without trimming.
Figure 31:
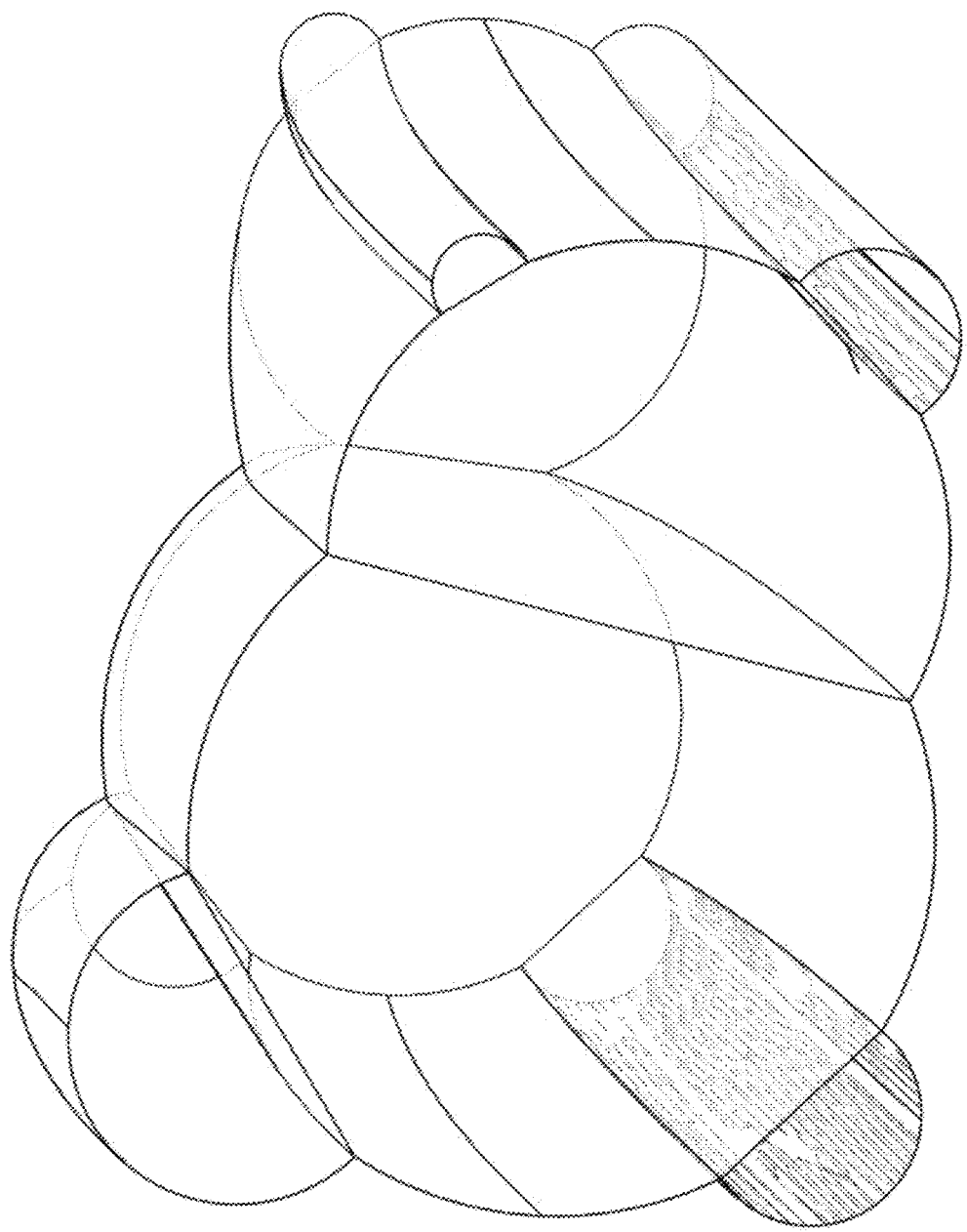
Figure 3J:
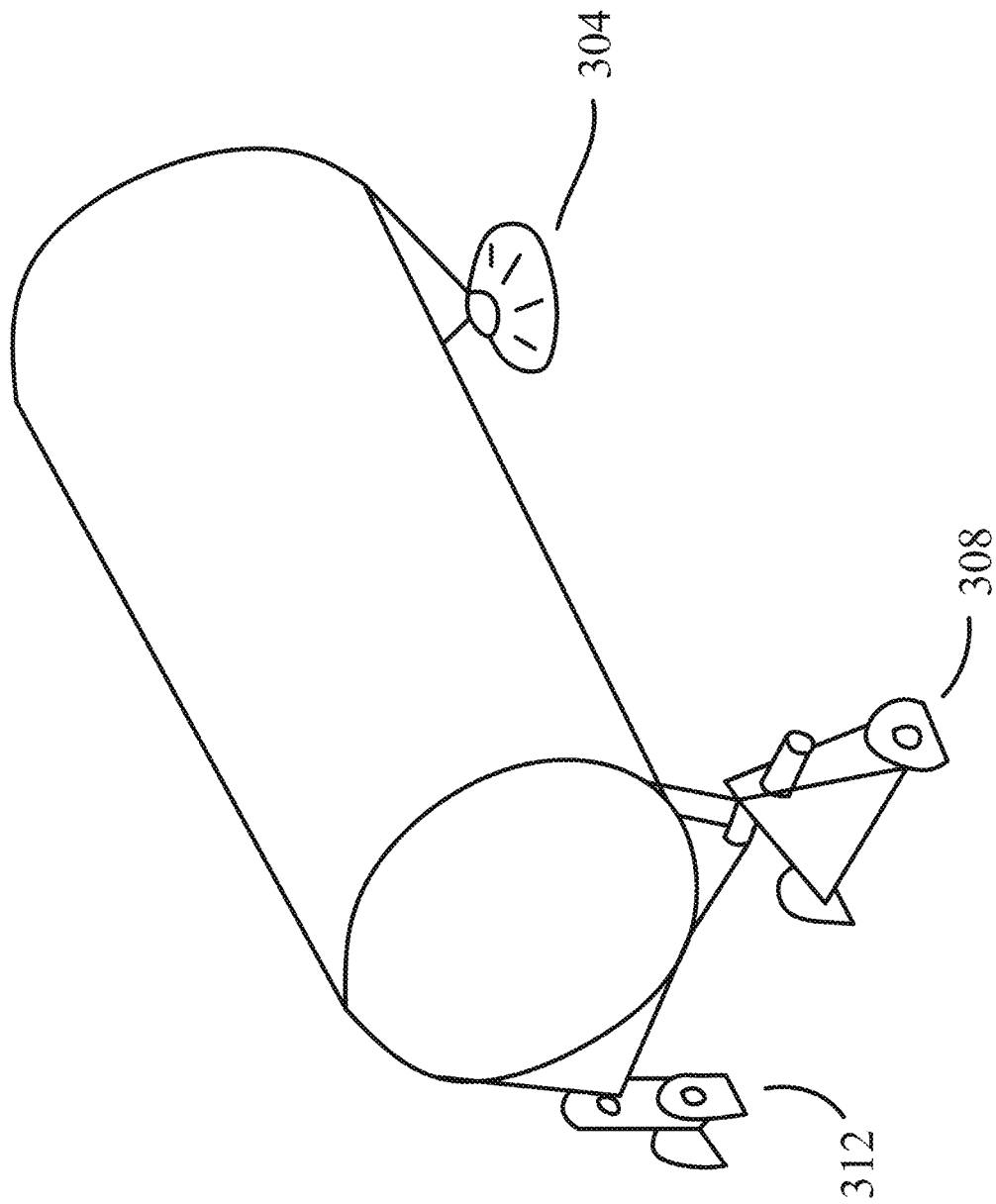
FIG. 3J illustrates an isometric view of an exemplary embodiment of a tank with a plurality of tank support links.
Figure 3K:
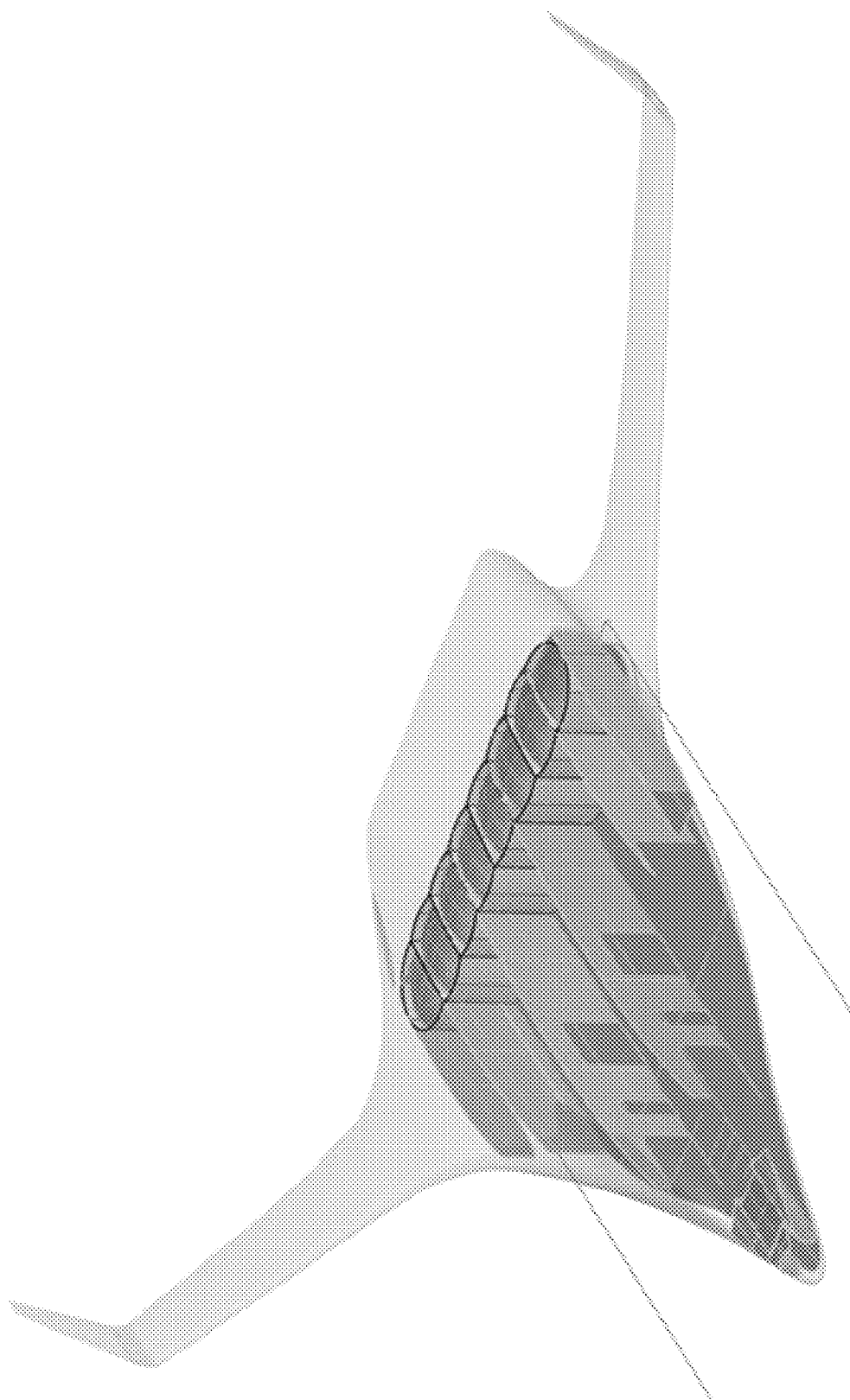
FIG. 3K shows an exemplary embodiment of an overview of a vertical axis "air mattress" tank.
Figure 3L:
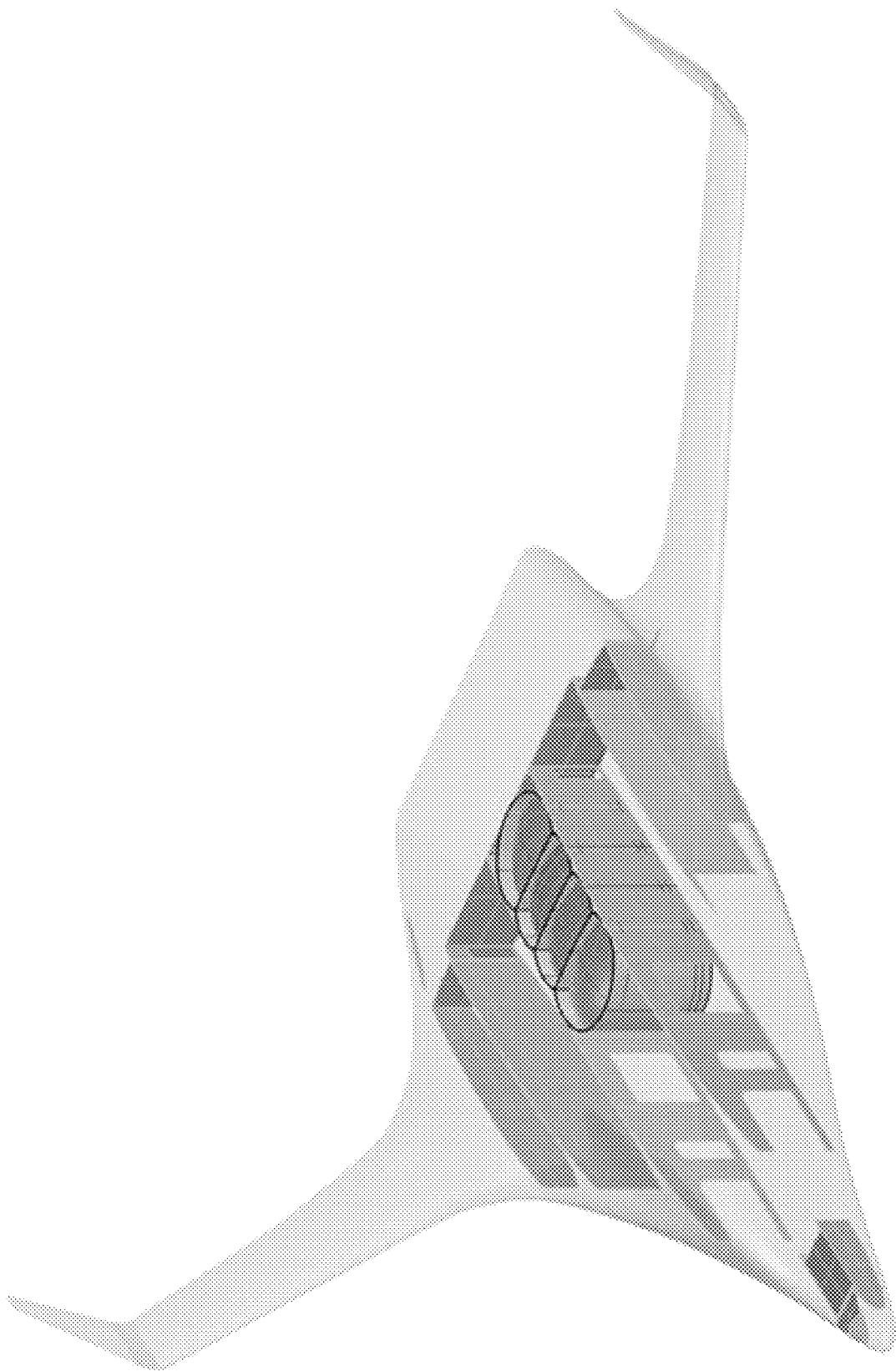
FIG. 3L shows an exemplary embodiment of an overview of longitudinal arrangement of a vertical axis "air mattress" tank.
Figure 3M:
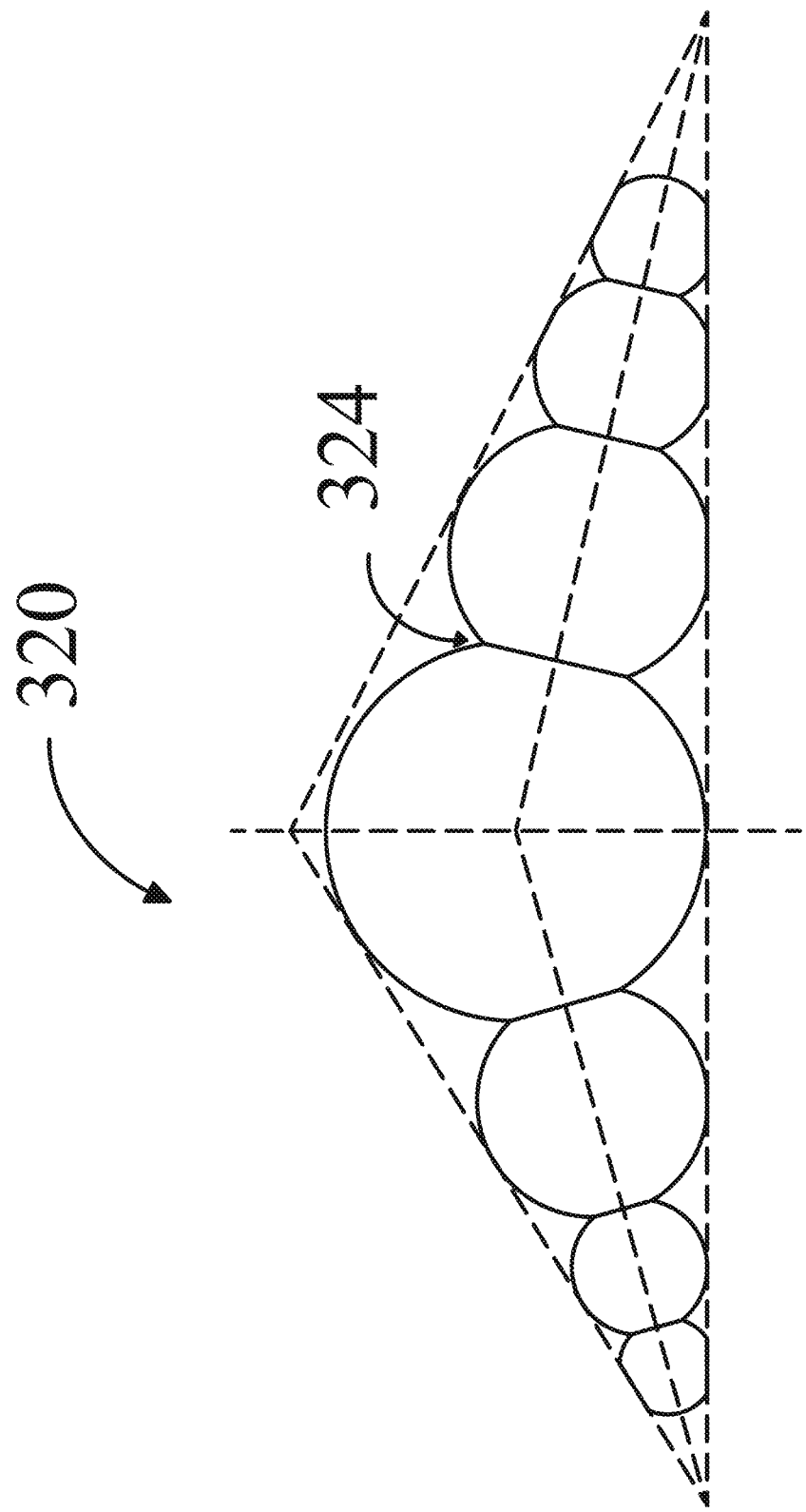
FIG. 3M illustrates a cross-section of an exemplary multi-chambered tank.
Figure 3N:
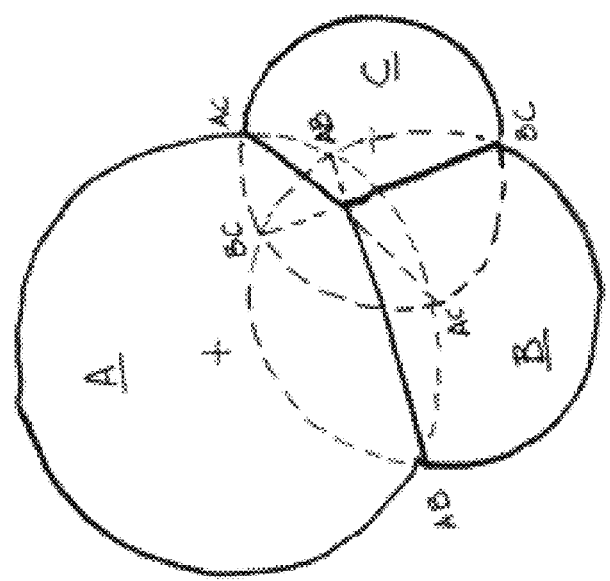
FIG. 3N illustrates a general case for a tank having multiple compartments.

Now referring to FIGS. 3A-N, exemplary tank geometries are illustrated. At least a tank 100 may include a shape, or tank geometry, having a plurality of continuously convex differentiable curved surfaces. All tank geometries may result in tank walls being substantially in tension, and at least a tank 100 may have any of the tank geometries described herein.

Now referring to just FIG. 3A, an isometric view of an exemplary embodiment of a conical tank is illustrated. At least a tank 100 may include a conical tank. A "conical" tank is a type of tapered tank that has a cone-shaped tank geometry. Conical pure-tension tank shapes may include spherical and cylindrical shapes, possibly with spherical end caps. For example, a tank could be conical with a spherical end cap, which may resemble an ice cream cone; this cone may be truncated, with another spherical end cap on an opposing end.

Now referring to FIG. 3B, an isometric view of an exemplary embodiment of a curved axisymmetric tank is exhibited. At least a tank 100 may be a curved axisymmetric tank. Another type of tapered tank, a "curved axisymmetric tank" has a circular cross-section with compound curvature on the sides or ends. Curved axisymmetric tank may be capped with hemispheres. A curved axisymmetric tank may more efficiently fill a volume with variable depth.

Now referring to FIG. 3C, an isometric view of an exemplary embodiment of a double-curved tank is presented. At least a tank 100 may include a double-curved tank. A "double-curved tank" occurs when a tapered tank is merged with a similar or mirror-image tank with a central septum. Two tanks forming a double-curved tank may be intersected along their length and a septum (i.e., junction 120) may be placed at the tank junction to address the resulting tension. In this disclosure, a "central septum" is a partition centrally located in a system separating two compartments. In some cases, central septum may not be parallel to the tank axis; for example, it may be favorable to fill a volume of constant width with a curved, variable-height ceiling. Tank axis may then be adjusted so that a tank wall on an outer side of a tank may be a selected distance from a cabin wall of an aircraft or other vehicle.

Now referring to FIG. 3D, a double-curved tank need not have identical compartments; a front quarter view of an exemplary embodiment of a dual tank with different diameters is illustrated. At least a tank 100 may include a dual tank with different diameters. In some compartments in this embodiment, height on one side of the compartment may be lower than on the other. Two or more compartments in at least a tank 100 may have different diameters if ceiling height is different across the cabin. Two or more tanks may be joined with one or more septa that may form a curved surface as seen in top view, see cambered tanks below. In an embodiment, shapes of the compartments may differ; in this case, two merged tanks forming a dual tank may have different diameters to maximize their height along their length.

Now referring to FIG. 3E, some tapered tanks may be sheared so that instead of following a straight centerline, at least a tank 100 follows a curved camber line. Shown in FIG. 3E is a quarter side view of an exemplary embodiment of a cambered, tapered tank. A camber line may enable a tank to more efficiently fit a volume with variable depth but one flat side, for example a floor, while conforming more closely to, for example, a curved ceiling. This may result in a centerline that may be curved as seen in the figure. An example may be shown in wireframe and surfaced views. This tank geometry may have a flat bottom and a curved top.

Now referring to FIG. 3F, an isometric and side quarter views of an exemplary embodiment of a dual-cambered tank is presented. At least at tank 108 may include a dual-cambered tank. A "dual-cambered" tank is the same as normal cambered tank, but the camber line may be curved from the top view as well as the side view. Two cambered lines may place an outer surface of a tank at a selected distance from a cabin wall of an aircraft or other vehicle. A bottom and right edge of at least a tank 100 may be straight while a top view and side view of camber line may be curved. Circular cross sections of a tank may be sheared so that they remain circles in a lateral-vertical plane, for example. Alternatively, circular cross sections may be orthogonal to the camber line. From a stress standpoint, wherever a camber line curvature of a tank is modest, a stress difference may be very small.

Now referring to FIG. 3G, a quarter front view of an exemplary embodiment of a double tank is shown. A double tank, as explained above, may have a curved septum separating two compartments of at least a tank 100.

Now referring to FIGS. 3H and 3I, a front quarter view of an exemplary embodiment of a multi-bubble tank is illustrated in both figures. Given a rectangular cabin cross-section with a longitudinally oriented tank, this cross-section may be occupied by a single circular cross-section tank. Alternatively, or additionally, as noted above, a double tank may be used to provide greater cross-section area within a rectangular cabin. Additional bubbles may be added to fill in corners of a cabin, such as four corners of a rectangular cabin. A "multi-bubble tank" is a tank that has more than two compartments attached together. In some cases, two more bubbles may be added to fill in the valleys between the two main tanks. Multi-bubble tanks may have any number of compartments, but there may be a diminishing return on increasing complexity; either engineering judgment or actual engineering may be applied. In an embodiment, a multi-bubble tank may have four lobes added to fill in the corners of a notional envelope indicated by the lines in the figure. This may provide a more valuable tank volume for a given compartment volume. Each compartment may have a circular cross section as shown, which may be trimmed to the large, main lobes. Main lobes may then be trimmed to small lobes. Each junction may be then faced with a septum. An illustrative and non-limiting example of this "trimming" can be seen in FIG. 3I, wherein a tank is trimmed with septa. On the other hand, a multi-bubble tank as depicted for illustrative purposes in FIG. 3H does not have trimming. At least a tank 100 may or may not have trimming.

Now referring to FIG. 3J, an isometric view of an exemplary embodiment of a tank with a plurality of tank support links is shown. At least a tank 100 needs to be mounted into aircraft 104, usually inside the body. As explained above, at least a tank 100 may be a permanent tank, meaning it may be mounted to the aircraft for an extended period of time. At least a tank 100 and blended wing body 104 may be constructed separately, and then at least a tank 100 may be mounted within. In an embodiment, at least a tank 100 and aircraft 104 may be independent because structural load paths of aircraft 104 may not pass through at least a tank 100, and structural load paths of at least a tank 100 may not pass-through aircraft 104, except insofar as necessary to restrain at least a tank 100 within aircraft 104. Given this constraint, there may be at least two conceptual methods for tank support links to mount at least a tank 100 to aircraft 104: rigid and linked mounts.

Still referring to FIG. 3J, at least a tank 100 may be mounted to aircraft 104 using a rigid mount. At least a tank 100 may be a standalone structure and may be connected to the aircraft 104 with one or more rigid connections. As used in this disclosure, "rigid mount" or "rigid connection" is a type of link that does not allow for free movement in any direction; the link is rigid and/or non-movable. For example, if at least a tank 100 includes a longitudinally-mounted cylindrical tank, the at least a tank may have a series of feet on either side, which may be connected to the structure of at least a tank 100. These feet may also be connected, for example, to a cabin floor structure. Additionally, a rigid mount may impose loads on aircraft 104 and at least a tank 100. In an embodiment, during a flight maneuver, aircraft 104 may stretch, compress, or deform slightly, which may ultimately and slightly alter the location of the example feet mounting points. Overall, this may ensure some deformation of a structure of at least a tank 100 and may impose additional loads on the tank that result in an unfavorably heavier design. Additional feet may be provided to distribute the load of at least a tank 100 more widely into aircraft 104. For example, feet may also connect the tank to cabin walls, the cabin ceiling structure and the cabin aft pressure bulkhead. This arrangement may not be intended to reinforce aircraft 104 by its connection to at least a tank 100. Also, it may not be intended to reinforce at least a tank 100 by its connection to aircraft 104.

Still referring to FIG. 3J, at least a tank 100 may be mounted to aircraft 104 using a linked mount. A standalone tank structure may be connected to the airframe in such a way that airframe deformation may not result in tank deformation, and vice-versa. This may be achieved through one or both of two ways to mount a tank: through its feet as described above, and through a series of links that may have hinges or ball-joints. As used in this disclosure, a "linked mount" is a structural feature attaching an object to another object that allows movement in one or more directions. With reference to feet of at least a tank 100 as described above, to avoid structure deformation, the feet may be mounted to the airframe with rubber fittings that provide compliance. Exemplary feet include mounts manufactured by LORD Corp., of Williston, Vermont. A series of links that may have hinges or ball-joints may also mount at least a tank 100 to aircraft 104 without structural deformation occurring. For example, and as shown in the figure, at least a tank 100 may be mounted at three points forming a triangle: a first point may be a rigid connection that provides location in three axes, a second point may be a link that provides substantially two (vertical and lateral) location, and a third point may be a link that provides substantially one (vertical) location. These three points are illustrated, as a non-limiting example, in the figure as links 304, 308, and 312, respectively. Link 304 may support vertically, laterally and longitudinally. Link 308 may support vertically and laterally because it may be pivoted about a lateral axis. Link 312 may provide only vertical support because it has ball joints at each end. A combination of links 304 and 308 may resist yaw and pitch motion. A combination of links 308 and 312 may resist roll. Altogether, motion of at least a tank 100 may be restrained against motion and rotation through the use of tank support links. A relative change in length between at least a tank 100 and aircraft 104 may be accommodated by Links 308 and 312 pivoting fore-aft. A relative change in width may be accommodated by Link 312 pivoting laterally. A relative change in height may be unconstrained. Torsion applied to at least a tank 100 by Links 308 and three points may be accommodated by a spherical or cylindrical connection at link 304. One skilled in the art, upon reviewing the entirety of this disclosure, can provide alternate ways to achieve these objectives.

Now referring to FIG. 3K, an exemplary embodiment of an overview of a vertical axis "air mattress" tank is exhibited. An "air mattress" tank, as used in this disclosure, is a multi-bubble tank, where each of a lobes' upper and lower surfaces have a common center point. When lobes of at least a tank 100 do not form a near-circular shape, a surface of at least a tank 100 may deform in order to achieve pure tension. As shown in the figure, an "air mattress" may extend laterally. Additionally, for example, "air mattress" may extend longitudinally as shown in FIG. 3L. In an embodiment and as described above, at least a tank 100 may be a vertically oriented multi-bubble tank wherein its pressurized walls and its septa may extend from a lower outer mold line to an upper outer mold line of a blended wing body. A top and bottom of at least a tank 100 may be closed out by end caps inset from the outer mold line to provide room for the outer mold line skin's supporting structure. This may assist aircraft 104 in resisting pressurization and simultaneously carrying the shear stress that is otherwise carried by structural members of aircraft 104. Also, as shown, at least a tank 100 may extend across the full width of the cabin and outboard cargo bays.

Now referring to FIG. 3L, an exemplary embodiment of an overview of longitudinal arrangement of a vertical axis "air mattress" tank is shown. An "air mattress" may extend laterally, for instance as described above, but may also, in a non-limiting example, extend longitudinally. FIG. 3L shows at least a tank 100 within a center bay. There are many ways to arrange vertical "air mattress" type tanks and this longitudinal arrangement may provide mutual support between aircraft 104 and at least a tank 100. In some embodiments, a length of at least tank 100 into aircraft 104 may be varied by either varying a diameter of at least a tank 100 or by doubling (or more) a number of rows of at least a tank 100. In a doubled tank, there may be a center lateral septum that replaces what is shown as the forward curved tank walls; this septum may be planar. In some cases, doubling (or more) the number of rows of at least a tank 100 may result in a smaller tank wall radius and a thinner and lighter tank wall (when compared to a single row of equal total longitudinal dimension).

Now referring to FIG. 3M, an exemplary embodiment of a cross-sectional view of tank having multiple chambers is illustrated. Multi-chambered tank 320 may provide pure tension for each chamber wall and septa at each junction 324. Pure tension may be achieved by equal pressure in each chamber of the tank 320. In some cases, junctions 324 may include convex junctions. Each of the junctions illustrated in FIG. 13 are shown as convex junctions 324.

Referring now to FIG. 3N, a general case for a tank 100 having multiple compartments is illustrated. FIG. 3N illustrates a cross section of a tank 100 having three compartments, a first compartment A, a second compartment B, and a third compartment C. Each compartment is approximated by a continuously convex differentiable curve, e.g., a circular section. The cross-section has three intersections between walls for each compartment, AB, AC, and BC. A junction 120, i.e., septum, runs from each intersection. FIG. 3N illustrates a general case, wherein each junction runs from an actual point of intersection toward an imaginary intersection between walls of intersecting compartments. For example, junction between compartment A and compartment B starts at intersection AB runs toward, a second imaginary intersection between curves AB (as represented by broken lines). In some embodiments, arranging the septa in this manner ensures that stress at each junction is substantially in tension. As can be seen in FIG. 3N, each junction runs (toward the imaginary intersection) until reaching a support (another junction or compartment wall). In some cases, this arrangement ensures that each junction is substantially in tension at each intersection of junctions.

Figure 4:
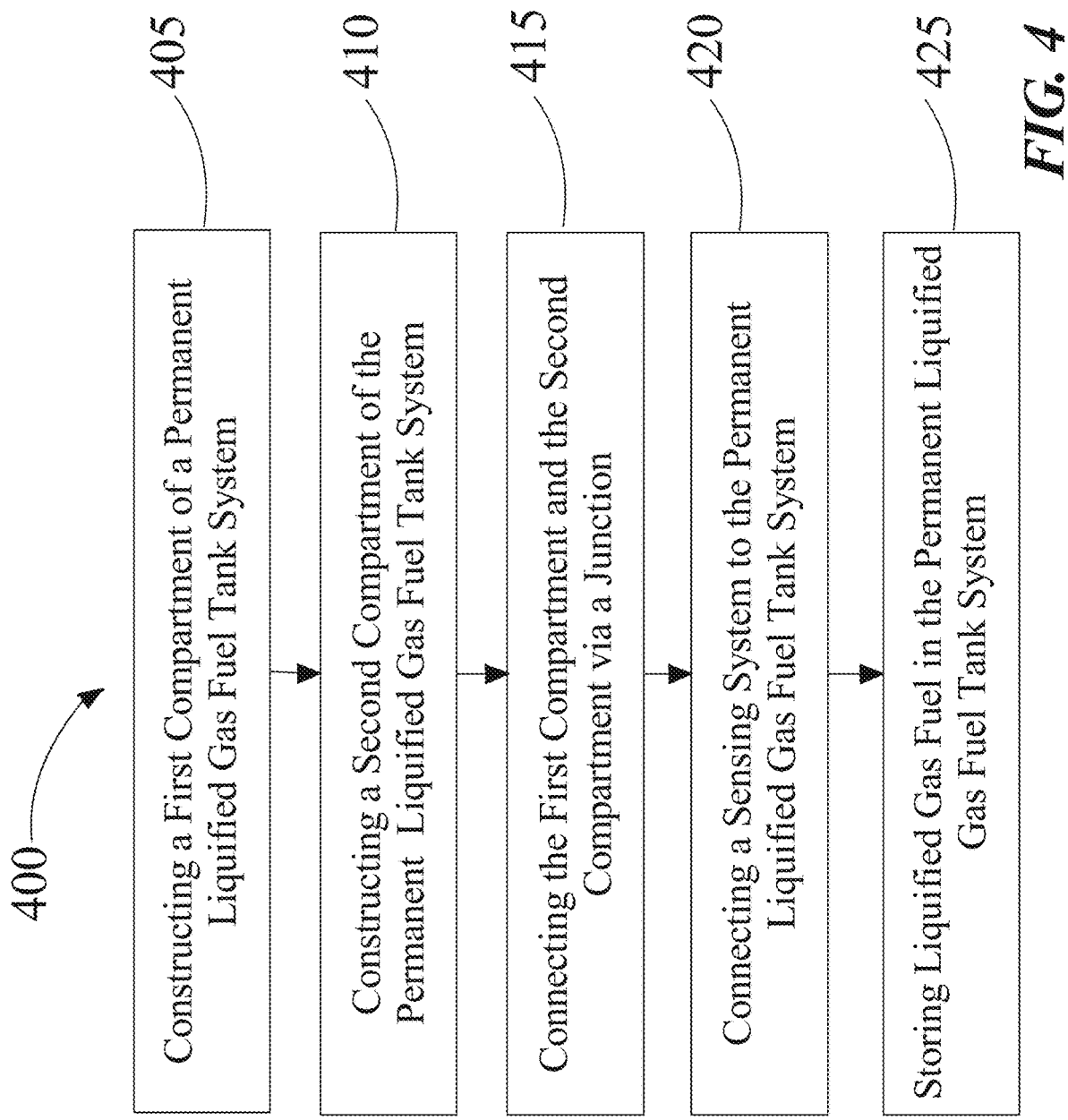
FIG. 4 is a block diagram for a method of use for manufacturing an aircraft with a liquified gas tank.

Now referring to FIG. 4, a block diagram for a method 400 for manufacturing a liquified gas fuel tank is illustrated. liquified gas fuel tank may be any of the at least a tank 100 described herein with reference to FIGS. 1-3L.

Still referring to FIG. 4, step 405, method 400 may include constructing a first compartment 108 of at least a tank 100. Constructing a first compartment 108 of at least a tank 100 may include forming a first space between a first inner wall and a first outer wall. It should be noted that first inner wall and first outer wall may have a first continuously convex differentiable curve cross section. In addition, first inner wall and first outer wall of first compartment 108 may be viewed seemingly as a shell having an internal space. However, the shell may not be a fully complete 3-D shape because first compartment 108 may be combined with another compartment of at least a tank 100, as illustrated in FIGS. 3G-3I.

Still referring to FIG. 4, at step 410, method 400 may include constructing a second compartment 116 of at least a tank 100. It should be noted that constructing second compartment 116 of at least a tank 100 may be done similarly or the same, with similar or the same considerations and parameters as constructing first compartment 108 of at least a tank 100, as described above. However, second compartment 116 may have a second continuously convex differentiable curve cross section different from first compartment 108. In some instances, a first continuously convex differentiable curve cross section may be the same as a second continuously convex differentiable curve cross section.

Still referring to FIG. 4, at step 415, method 400 may include connecting first compartment 108 to second compartment 116 via junction 120. Junction 120 may be added to at least a tank 100 via welding, brazing or any other suitable form of connections. Junction 120 may also be the same material as first compartment 108, second compartment 116, or both. Junction 120 may have one or more vents 124 installed therein before connecting first compartment 108 to second compartment 116 to reduce difficulties that may occur if the one or more vents 124 were installed after the connection.

Still referring to FIG. 4, at step 420, method 400 may include connecting sensing component 128 to at least a tank 100. Connecting sensing component 128 to at least a tank 100 may include electrically coupling a controller 132 to various components of the at least a tank 100, the sensing component 128, or both. The wiring used to couple controller 132 to other components of aircraft 104 may be any suitable wiring capable of transmitting signals. In some embodiments, controller 132 may be coupled to one or more sensors 140, one or more valves 144, or both. Thus, allowing any data recorded by one or more sensors 140 to be sent and processed by controller 132, and in response to processing the data, the controller 132 may send out a signal to control one or more valves 144.

Still referring to FIG. 4, at step 425, method 400 may include storing liquified gas fuel 112 inside at least a tank 100. Liquified gas fuel 112 may be any of the liquified gas fuels as described herein with reference to FIG. 1. At least a tank 100 may be any of the tanks described herein with reference to FIGS. 1-3L.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 5. Furthermore, there is no intention to be bound by any expressed or implied theory presented in this disclosure.

Figure 5:
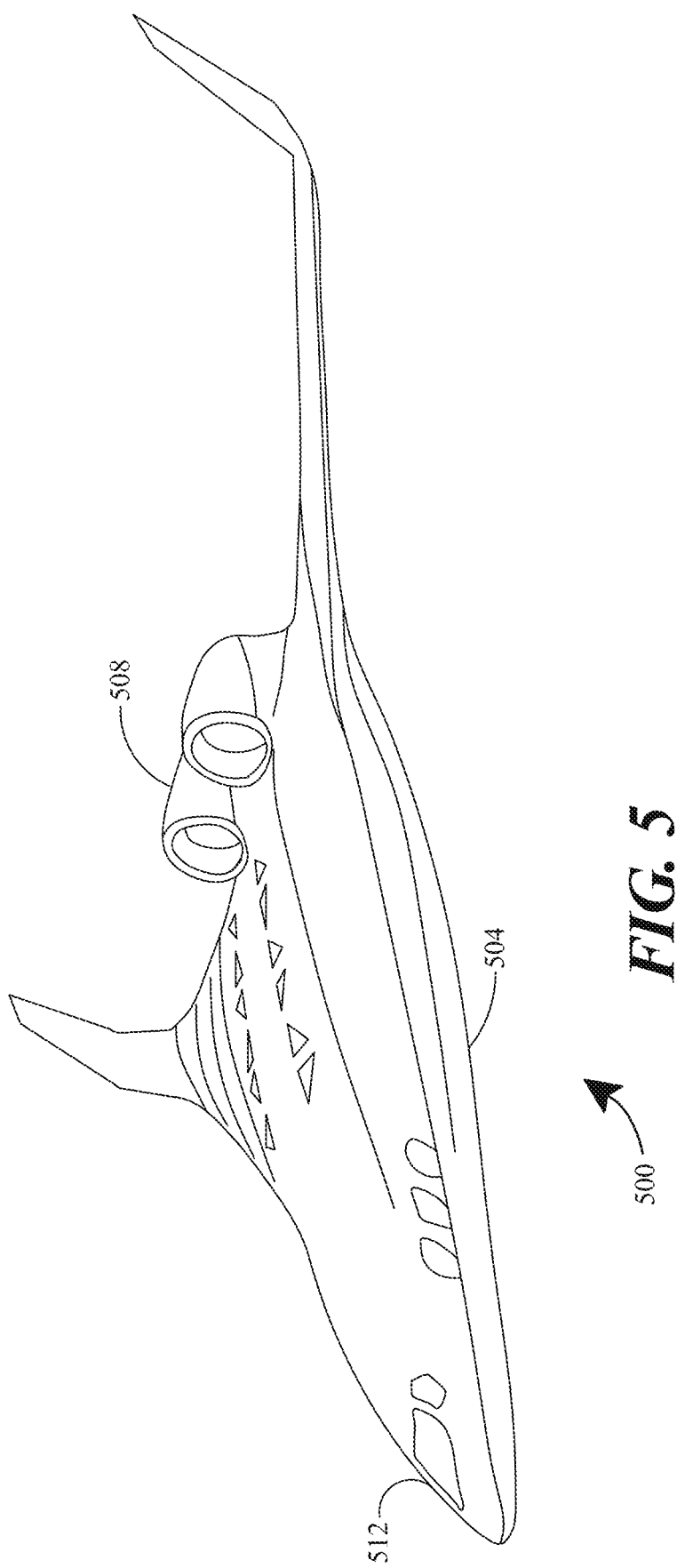
FIG. 5 is an exemplary embodiment of an aircraft.

Referring to FIG. 5, an exemplary blended wing aircraft 500 is illustrated; in some embodiments, a liquified gas fuel tank as described in this disclosure may be incorporated and/or installed in an aircraft 500, for instance and without limitation as illustrated in this figure. Aircraft 600 may include a blended wing body 504. For the purposes of this disclosure, a "blended wing body aircraft" is an aircraft having a blended wing body. As used in this disclosure, a "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB 504 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 504 design may or may not be tailless. One potential advantage of a BWB 504 may be to reduce wetted area and any accompanying drag associated with a conventional wing-body junction. In some cases, a BWB 504 may also have a wide airfoil-shaped body, allowing entire aircraft to generate lift and thereby facilitate reduction in size and/or drag of wings. In some cases, a BWB 504 may be understood as a hybrid shape that resembles a flying wing, but also incorporates features from conventional aircraft. In some cases, this combination may offer several advantages over conventional tube-and-wing airframes. In some cases, a BWB airframe 504 may help to increase fuel economy and create larger payload (cargo or passenger) volumes within the BWB 504. BWB 504 may allow for advantageous interior designs. For instance, cargo can be loaded and/or passengers can board from the front or rear of the aircraft. A cargo or passenger area may be distributed across a relatively wide (when compared to a conventional tube-wing aircraft) fuselage, providing a large usable volume. In some embodiments, passengers seated within an interior of aircraft, real-time video at every seat can take place of window seats.

With continued reference to FIG. 5, BWB 504 of aircraft 500 may include a nose portion. A "nose portion," for the purposes of this disclosure, refers to any portion of aircraft 500 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 5, BWB 604 may include at least a structural component of aircraft 500. Structural components may provide physical stability during an entirety of an aircraft's 500 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 500 structure, they may be so named A, B, C, and so on named from nose to tail. Pillars, like any structural element, may be disposed a distance away from each other, along an exterior of aircraft 500 and BWB 604. Depending on manufacturing method of BWB 604, pillars may be integral to frame and skin, comprised entirely of internal framing, or alternatively, may be only integral to structural skin elements. Structural skin will be discussed in greater detail below.

With continued reference to FIG. 5, BWB 604 may include a plurality of materials, alone or in combination, in its construction. At least a BWB 604, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 604 may comprise aluminum tubing mechanically coupled in various and orientations. Mechanical fastening of aluminum members (whether pure aluminum or alloys) may comprise temporary or permanent mechanical fasteners appreciable by one of ordinary skill in the art who has reviewed the entirety of this disclosure including, but not limited to, screws, nuts and bolts, anchors, clips, welding, brazing, crimping, nails, blind rivets, pull-through rivets, pins, dowels, snap-fits, clamps, and the like. BWB 604 may additionally or alternatively use wood or another suitably strong yet light material for an internal structure.

With continued reference to FIG. 5, aircraft 500 may include monocoque or semi-monocoque construction. BWB 604 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art, upon reviewing the entirety of this disclosure, will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be defined in terms of stress and strain, wherein "stress" is force per area and "strain" is an elongation or deformation generally represented as a proportion or fraction of a length or angle. For example, the strain of a one-hundred-inch-long rod that is stretched to 101 inches is the one inch of stretch divided by the one-hundred-inch length, or a 1% strain. In the case of shear, strain may be measured by an angular deformation. Rigidity may be considered analogous to stiffness and, for linear displacements, may be quantified as Young's modulus. Young's modulus may be defined as stress divided by strain. Rigidity may be defined as a force necessary to bend and/or flex a material and/or structure to a given degree. In embodiments, carbon fibers may additionally, or alternatively, be composited with other materials like graphite to form reinforced carbon-carbon composites, which include high heat tolerances over 2000° C. A person of skill in the art, upon reviewing the entirety of this disclosure, will further appreciate that aerospace applications may require high-strength, low-weight, high heat resistance materials in a plurality of roles, such as without limitation fuselages, fairings, control surfaces, and structures, among others.

With continued reference to FIG. 5, BWB 604 may include at least a fuselage. A "fuselage," for the purposes of this disclosure, refers to a main body of an aircraft 500, or in other words, an entirety of the aircraft 500 except for nose, wings, empennage, nacelles, and control surfaces. In some cases, fuselage may contain an aircraft's payload. At least a fuselage may comprise structural components that physically support a shape and structure of an aircraft 500. Structural components may take a plurality of forms, alone or in combination with other types. Structural components vary depending on construction type of aircraft 500 and specifically, fuselage. A fuselage 612 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 5, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 500. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 500 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 5, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 5, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art, having reviewed the entirety of this disclosure, will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 5, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 5, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 5, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lb./in$^2$) or Pascals (Pa). In semi-monocoque construction stressed skin bears part of aerodynamic loads and additionally imparts force on an underlying structure of stringers and formers.

With continued reference to FIG. 5, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 500 is in its level flight orientation or sitting on ground. A post may act similarly to stringer in that it is configured to support axial loads in compression due to a load being applied parallel to its axis due to, for example, a heavy object being placed on a floor of aircraft 500. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 5, aircraft 500 may include at least a flight component 608. A flight component 608 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 500 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 500. In some embodiments, at least a flight component 608 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 5, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art, upon reviewing the entirety of this disclosure, would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 5, at least a flight component may be one or more devices configured to affect aircraft's 500 attitude. "Attitude", for the purposes of this disclosure, is the relative orientation of a body, in this case aircraft 500, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 500. A plurality of attitude datums may indicate one or more measurements relative to an aircraft's pitch, roll, yaw, or throttle compared to a relative starting point. One or more sensors may measure or detect an aircraft's 500 attitude and establish one or more attitude datums. An "attitude datum", for the purposes of this disclosure, refers to at least an element of data identifying an attitude of an aircraft 500.

With continued reference to FIG. 5, in some cases, aircraft 500 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively, or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 5, in some cases, aircraft 500 may include at least a pilot control. As used in this disclosure, a "pilot control," is an interface device that allows an operator, human or machine, to control a flight component of an aircraft. Pilot control may be communicatively connected to any other component presented in aircraft 500, the communicative connection may include redundant connections configured to safeguard against single-point failure. In some cases, a plurality of attitude datums may indicate a pilot's instruction to change heading and/or trim of an aircraft 500. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 500. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 608 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 5, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 608. At least a flight component 608 may include any propulsor as described herein. In embodiment, at least a flight component 608 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 5, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 5, at least a flight component 608 may include wings, empennages, nacelles, control surfaces, fuselages, and landing gear, among others, to name a few. In embodiments, an empennage may be disposed at the aftmost point of an aircraft body 604. Empennage may comprise a tail of aircraft 500, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 500 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 500 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 604 aircraft 500 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 608 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 608 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 500. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet"

has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 500 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 5, aircraft 500 may include an energy source. Energy source may include any device providing energy to at least a flight component 608, for example at least a propulsors. Energy source may include, without limitation, a generator, a photovoltaic device, a fuel cell such as a natural gas fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 5, in further nonlimiting embodiments, an energy source may include a fuel store. As used in this disclosure, a "fuel store" is an aircraft component configured to store a fuel. A fuel store may include, without limitation, a liquified gas fuel tank as described in this disclosure. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 604 of aircraft 500, for example without limitation within a wing portion 612 of blended wing body 608. Aviation fuels may include petroleum-based fuels, or petroleum and synthetic fuel blends, used to power aircraft 500. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 500. Liquid fuel may include Jet-A. Presently Jet-A powers modern commercial airliners and is a mix of extremely refined kerosene and burns at temperatures at or above 49° C. (108° F.). Kerosene-based fuel has a much higher flash point than gasoline-based fuel, meaning that it requires significantly higher temperature to ignite.

With continued reference to FIG. 5, modular aircraft 500 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 5, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by gas. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 5, aircraft 500 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 5, aircraft 500 may include multiple flight component 608 sub-systems, each of which may have a separate energy source. For instance, and without limitation, one or more flight components 608 may have a dedicated energy source. Alternatively, or additionally, a plurality of energy sources may each provide power to two or more flight components 608, such as, without limitation, a "fore" energy source providing power to flight components located toward a front of an aircraft 500, while an "aft" energy source provides power to flight components located toward a rear of the aircraft 500. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 608. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 5, aircraft 500 may include a flight component 608 that includes at least a nacelle 608. For the purposes of this disclosure, a "nacelle" is a streamlined body housing, which is sized according to that which is houses, such as without limitation an engine, a fuel store, or a flight component. When attached by a pylon entirely outside an airframe 604 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 500 partially or wholly enveloped by an outer mold line of the aircraft 500. At least a nacelle may be designed to be streamlined. At least a nacelle may be asymmetrical about a plane comprising the longitudinal axis of the engine and the yaw axis of modular aircraft 500.

With continued reference to FIG. 5, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 5, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 5, in nonlimiting embodiments, at least a flight component 608 may include an airbreathing engine such as a jet engine, turbojet engine, turboshaft engine, ramjet engine, scramjet engine, hybrid propulsion system, turbofan engine, or the like. At least a flight component 608 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 5, an aircraft 500 may include a flight controller. As used in this disclosure, a "flight controller" is a device that generates signals for controlling at least a flight component 608 of an aircraft 500. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 5, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 500 and/or computing device.

With continued reference to FIG. 5, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 5, a propulsor of aircraft 500 may comprise a combustion engine. Combustion engine is configured to burn the fuel from the fuel source to produce mechanical work. Resulting mechanical work may be used to power the propulsor. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that includes a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element. Additionally, at least an electric motor of the propulsor may be operatively connected with a fuel cell by way of electrical communication, for example through one or more conductors.

Still referring to FIG. 5, aircraft 500 may comprise at least an auxiliary power unit powered by the fuel and mechanically affixed to the aircraft. As used in this disclosure, an "auxiliary power unit" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a controller 132) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a controller 132) and any related information (e.g., data structures and data) that causes the machine to perform any one of the methodologies and/or embodiments described herein.

Examples of a controller 132 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a controller 132 may include and/or be included in a kiosk.

Figure 6:
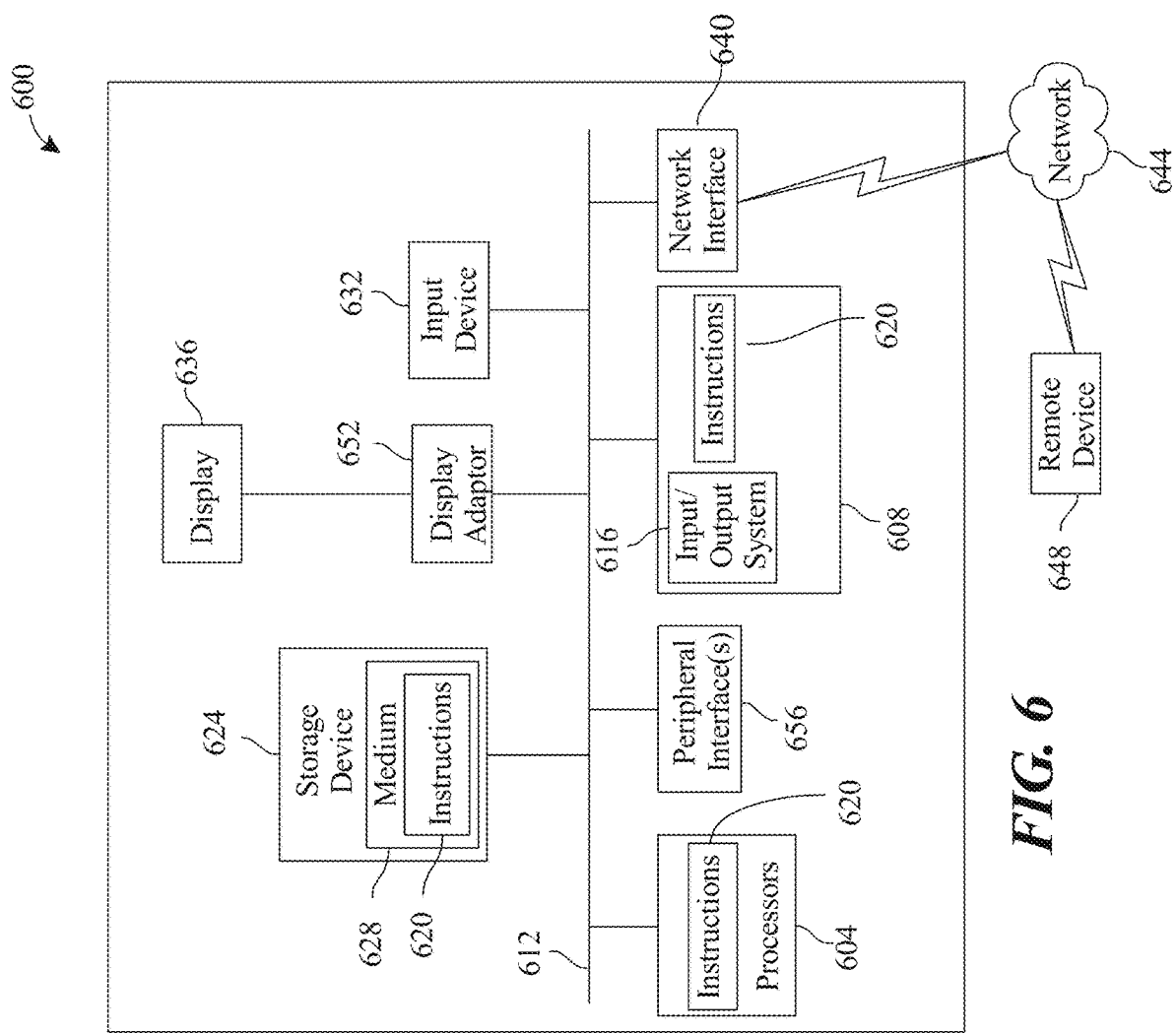
FIG. 6 is a block diagram of a computing system that can be used to implement any one or more of the methodologies disclosed herein and any one or more portions thereof.

FIG. 6 shows a diagrammatic representation of one embodiment of a controller 132 in the exemplary form of a computer system 600 within which a set of instructions for causing a control system to perform any one or more of the aspects and/or methodologies of the present disclosure may be executed. It is also contemplated that multiple controller 132s may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two controller 132s, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A liquified gas fuel tank incorporated in an aircraft to fuel comprising:
   a first compartment wherein:
      the first compartment has a first cross-section describing a first continuously convex differentiable curve;
      the first compartment includes an inner volume configured to contain fuel; and
      the first compartment is configured to be pressurized;
   a second compartment wherein:
      the second compartment has a second cross-section describing a second continuously convex differentiable curve which intersects the first continuously convex differentiable curve at an intersection; and
      the second compartment includes an additional inner volume fluidly connected to the inner volume of the first compartment;
   a junction configured to structurally support each of the first compartment and the second compartment at the intersection; and
   a sensing component, wherein the sensing component comprises:
      a gas evacuation element, wherein the gas evacuation element is configured to sense a gas concentration and purge gas from the first compartment and the second compartment;
      one or more sensors; and
      a controller communicatively connected to the gas evacuation element, wherein the controller is configured to:
         receive a second indication from the one or more sensors, wherein the second indication indicates that a second gas concentration is below a threshold gas concentration; and
         deactivate the gas evacuation element based on the second indication.

2. The liquified gas fuel tank of claim 1, wherein:
   the first compartment comprises a first inner wall defining a first internal cavity of the first compartment and a first outer wall exterior to the first inner wall, wherein a first separation of the first inner wall and the first outer wall defines a first space; and
   the second compartment comprises a second inner wall defining a second internal cavity of the second compartment and a second outer wall exterior to the second inner wall, wherein a second separation of the second inner wall and the second outer wall defines a second space.

3. The liquified gas fuel tank of claim 2, wherein a thickness of the first space is less than $\frac{1}{10}$ of a first radial distance of the first continuously convex differentiable curve, and wherein the second space is less than $\frac{1}{10}$ of a second radial distance of the second continuously convex differentiable curve.

4. The liquified gas fuel tank of claim 2, wherein the first outer wall and the second outer wall prevent ambient air from entering the first internal cavity and the second internal cavity, respectively.

5. The liquified gas fuel tank of claim 2, wherein the junction comprises one or more apertures configured to enable fluid communication between the first compartment and the second compartment.

6. The liquified gas fuel tank of claim 5, wherein the one or more apertures comprise one or more actuatable vents configured to be switched to an open position to facilitate fluid transfer between the first internal cavity and second internal cavity.

7. The liquified gas fuel tank of claim 1, wherein a first wall of the first compartment, a second wall of the second compartment, and the junction are all configured to be in tension when the first compartment is pressurized.

8. The liquified gas fuel tank of claim 1, wherein the first compartment and the second compartment are configured to have equal pressure.

9. The liquified gas fuel tank of claim 1, wherein a plurality of conduit lines is connected to the sensing component via the gas evacuation element, and wherein the plurality of conduit lines is configured to receive a boiled-off gas.

10. A method of manufacturing a liquified gas fuel tank for an aircraft, the method comprising:
constructing a first compartment wherein:
the first compartment has a first cross-section describing a first continuously convex differentiable curve;
the first compartment includes an inner volume configured to contain fuel; and
the first compartment is configured to be pressurized;
constructing a second compartment wherein:
the second compartment has a second cross-section describing a second continuously convex differentiable curve which intersects the first continuously convex differentiable curve at an intersection; and
the second compartment includes an additional inner volume fluidly connected to the inner volume of the first compartment; and
connecting the first compartment and the second compartment with a junction configured to structurally support each of the first compartment and the second compartment at the intersection;
providing a sensing component, the sensing component comprising:
a gas evacuation element, wherein the gas evacuation element is configured to sense a gas concentration and purge gas from the first compartment and the second compartment;
one or more sensors; and
a controller communicatively connected to the gas evacuation element, wherein the controller is configured to:
receive a second indication from the one or more sensors, wherein the second indication indicates that a second gas concentration is below a threshold gas concentration; and
deactivate the gas evacuation element based on the second indication.

11. The method of claim 10, wherein:
constructing the first compartment comprises forming a first inner wall defining a first internal cavity of the first compartment and a first outer wall exterior to the first inner wall, wherein a first separation of the first inner wall and the first outer wall defines a first space; and
constructing the second compartment comprises forming a second inner wall defining a second internal cavity of the second compartment and a second outer wall exterior to the second inner wall, wherein a second separation of the second inner wall and the second outer wall defines a second space.

12. The method gf claim 11, wherein a thickness of the first space is less than 1/10 of a first radial distance of the first continuously convex differentiable curve, and wherein the second space is less than 1/10 of a second radial distance of the second continuously convex differentiable curve.

13. The method of claim 11, wherein the first outer wall and the second outer wall prevent ambient air from entering the first internal cavity and the second internal cavity, respectively.

14. The method of claim 11, wherein the junction comprises one or more apertures configured to enable fluid communication between the first compartment and the second compartment.

15. The method of claim 14, wherein the one or more apertures comprise one or more actuatable vents configured to be switched to an open position to facilitate fluid transfer between the first internal cavity and second internal cavity.

16. The method of claim 10, wherein a first wall of the first compartment, a second wall of the second compartment, and the junction are all configured to be in tension when the first compartment is pressurized.

17. The method of claim 10, wherein the first compartment and the second compartment are configured to have equal pressure.

18. The method of claim 10, wherein a plurality of conduit lines is connected to the sensing component via the gas evacuation element, and wherein the plurality of conduit lines is configured to receive a boiled-off gas.

* * * * *